United States Patent
Martin et al.

(10) Patent No.: US 12,106,061 B2
(45) Date of Patent: Oct. 1, 2024

(54) AUTOMATED NARRATIVES OF INTERACTIVE COMMUNICATIONS

(71) Applicant: Clarabridge, Inc., Reston, VA (US)

(72) Inventors: Fabrice Martin, Washington, DC (US); Rafael Algara-Torre, Ashburn, VA (US); Leonardo Apolonio, Washington, DC (US); Mark Arehart, Reston, VA (US); Zhexin Chen, Fairfax, VA (US); Sandesh Gade, McLean, VA (US); Caroline Kinsella, Austin, TX (US); Ellen Loeshelle, Arlington, VA (US); Ram Ramachandran, Herndon, VA (US); Maksym Shcherbina, Sterling, VA (US); Eliana Vornov, Washington, DC (US); Ivan Volonsevich, Clifton, VA (US)

(73) Assignee: CLARABRIDGE, INC., Reston, VA (US)

( * ) Notice: Subject to any disclaimer, the term of this patent is extended or adjusted under 35 U.S.C. 154(b) by 659 days.

(21) Appl. No.: 17/301,483

(22) Filed: Apr. 5, 2021

(65) Prior Publication Data

US 2021/0342554 A1    Nov. 4, 2021

Related U.S. Application Data

(63) Continuation-in-part of application No. 16/928,397, filed on Jul. 14, 2020, now Pat. No. 11,546,285.
(Continued)

(51) Int. Cl.
*G06F 40/40* (2020.01)
*G06F 16/23* (2019.01)
(Continued)

(52) U.S. Cl.
CPC .......... *G06F 40/40* (2020.01); *G06F 16/2379* (2019.01); *G06F 40/117* (2020.01); *G06F 40/186* (2020.01); *G06F 40/30* (2020.01)

(58) Field of Classification Search
CPC .... G06F 40/40; G06F 16/2379; G06F 40/117; G06F 40/186; G06F 40/30; G06F 16/355;
(Continued)

(56) References Cited

U.S. PATENT DOCUMENTS 6,976,031 B1 * 12/2005 Toupal .................. G06F 40/186
707/999.009
8,856,056 B2    10/2014 Di Sciullo et al.
(Continued)

FOREIGN PATENT DOCUMENTS

WO    0052553 A2    9/2000

OTHER PUBLICATIONS

Hasan, K. S., & Ng, V. (Oct. 2014). Why are you taking this stance? identifying and classifying reasons in ideological debates. In Proceedings of the 2014 conference on empirical methods in natural language processing (EMNLP) (pp. 751-762). (Year: 2014).*
(Continued)

*Primary Examiner* — Douglas Godbold
*Assistant Examiner* — Philip H Lam
(74) *Attorney, Agent, or Firm* — Brake Hughes Bellermann LLP

(57) ABSTRACT

Implementations analyze transaction data and objectively capture pre-identified desired information about the analyzed transaction data in a consistently organized manner. An example system includes a user interface that enables a user to provide static portions and dynamic portions of a template. The dynamic portions identify variables that are replaced with either data extracted from the transaction or text based on the output of classifiers applied to the trans-
(Continued)

action. An example method includes applying classifiers to scoring units of a transaction to generate classifier tags for the scoring units and generating a narrative by replacing variables in an automated narrative template with text based on at least some of the classifier tags. The automated narrative template includes non-variable portions and at least some variable portions, each identifying a template variable and having variable replacement logic configured to replace the template variable using the classifier tags and/or data extracted from the transaction.

21 Claims, 12 Drawing Sheets

Related U.S. Application Data

(60) Provisional application No. 63/198,504, filed on Oct. 23, 2020, provisional application No. 63/017,434, filed on Apr. 29, 2020.

(51) Int. Cl.
  *G06F 40/117* (2020.01)
  *G06F 40/186* (2020.01)
  *G06F 40/30* (2020.01)

(58) Field of Classification Search
  CPC ........ G06F 40/35; G06F 40/56; G06F 40/151; G06Q 10/0639
  See application file for complete search history.

(56) References Cited

U.S. PATENT DOCUMENTS

| | | | |
|---|---|---|---|
| 10,162,900 B1 | 12/2018 | Chatterjee et al. | |
| 10,380,490 B1* | 8/2019 | Somasundaran | G06F 40/253 |
| 11,546,285 B2 | 1/2023 | Martin et al. | |
| 11,763,239 B1* | 9/2023 | Di Prinzio | G06Q 30/016 706/11 |
| 2005/0216830 A1* | 9/2005 | Turner | G06F 40/186 715/255 |
| 2008/0126951 A1 | 5/2008 | Sood et al. | |
| 2011/0246182 A1* | 10/2011 | Allen | G06F 40/10 704/E11.001 |
| 2012/0130771 A1 | 5/2012 | Kannan et al. | |
| 2013/0246903 A1 | 9/2013 | Mukai | |
| 2013/0262092 A1* | 10/2013 | Wasick | G06F 40/56 704/9 |
| 2013/0262320 A1 | 10/2013 | Makanawala et al. | |
| 2013/0268534 A1* | 10/2013 | Mathew | G06F 16/35 707/740 |
| 2015/0195406 A1* | 7/2015 | Dwyer | G10L 15/02 379/265.07 |
| 2015/0271119 A1 | 9/2015 | Goncalves | |
| 2016/0026962 A1* | 1/2016 | Shankar | G06Q 10/06398 705/7.42 |
| 2016/0092793 A1* | 3/2016 | Garrow | G16H 70/40 706/12 |
| 2017/0200234 A1* | 7/2017 | Morse | G06F 40/143 |
| 2017/0213138 A1 | 7/2017 | Bojja et al. | |
| 2017/0318035 A1* | 11/2017 | Baughman | G06N 3/044 |
| 2018/0012598 A1* | 1/2018 | Thirukovalluru | G10L 15/26 |
| 2018/0260380 A1* | 9/2018 | Birnbaum | G06Q 10/063 |
| 2018/0329987 A1* | 11/2018 | Tata | G06N 3/08 |
| 2019/0324981 A1* | 10/2019 | Counts | G06F 40/216 |
| 2019/0392035 A1* | 12/2019 | Indenbom | G06F 40/295 |
| 2020/0082810 A1* | 3/2020 | Kneller | G06N 5/047 |
| 2020/0285683 A1* | 9/2020 | David | G06F 40/30 |
| 2020/0374398 A1* | 11/2020 | Sharma | G06Q 10/063112 |

OTHER PUBLICATIONS

Saini, T., & Tripathi, S. (Mar. 2018). Predicting tags for stack overflow questions using different classifiers. In 2018 4th International Conference on Recent Advances in Information Technology (RAIT) (pp. 1-5). IEEE (Year: 2018).*
International Search Report and Written Opinion for PCT Application No. PCT/US2021/070482, mailed on Aug. 2, 2021, 12 pages.
International Search Report and Written Opinion for PCT Application No. PCT/US2021/070483, mailed on Jul. 29, 2021, 11 pages.

* cited by examiner

AUTOMATED NARRATIVES OF INTERACTIVE COMMUNICATIONS

RELATED APPLICATIONS

This application is a non-provisional of, and claims priority to, U.S. Provisional Application No. 63/198,504, filed Oct. 23, 2020, titled "Narrative Summaries of Interactive Communications." This application is also a continuation-in-part of U.S. application Ser. No. 16/928,397, filed Jul. 14, 2020, titled "Intelligent Transaction Scoring," which is a non-provisional of, and claims priority to, U.S. Application No. 63/017,434, filed Apr. 29, 2020, titled "Intelligent Transaction Scoring." The disclosures of these applications are incorporated herein by reference in their entirety.

BACKGROUND

Organizations often conduct interactive communications, such as customer service calls, teleconferences, and video conferences chats, or support emails. In some cases, the organization may require or desire a summary of what transpired during an interaction. For example, after a customer service call, the organization may have the customer service representative draft a summary of the interaction. Summaries may be intended to help another representative interacting with the same customer to get up to speed faster. However, in practice, the agent-drafted summaries tend to be short, subjective, full of acronyms, inconsistent, include inaccuracies, and often lacking helpful or important details because the agents are incentivized to move quickly to the next call.

SUMMARY

Implementations provide a system for generating an automated narrative of interactive communications. The automated narrative is based on a template. The template includes non-variable text portions and variable portions. The variable portions may represent enrichments obtained and/or derived from the communications. The enrichments are determined by variable replacement logic. The variable portions may represent metadata associated with, derived from, or obtained from the communications. The variable portions may be represented by other templates. The interaction may also be referred to herein as a transaction. The interaction can represent communications between two or more participants. The interaction can be telephonic, a video conference, an email or string of emails, a chat session, etc. In some implementations, a transaction may be a text document and may not be associated with a person besides the author, e.g., a social media post, a word processing document, a review, etc. In some implementations, a transaction may cover multiple interactions, e.g., all the communications a customer had with the organization to resolve an issue (e.g., under one ticket number) or all the calls an agent had during a shift. Thus, reference to an interaction (transaction) is understood to also refer to a series of related interactions (transactions). The variable replacement logic can be identification of a field and/or identification of a result of analysis of the transaction by one or more classifiers applied to the transaction. The variable replacement logic can be more complex, e.g., involving a combination of multiple fields and/or analysis results. The variable replacement logic can include inserting another summary template when a condition is met or is not met (e.g., absent, unfulfilled). The variable replacement logic can include inserting certain text when a condition is met or is not met. For example, if a transcription of a call is of low quality (e.g., garbled) and a topic or reason for the call cannot be confidently predicted by a classifier, a variable portion relating to the topic may be omitted from the automated narrative. Thus, the variable portions of a template can represent a diverse and complex inclusion logic based on characteristics of the transaction, while still being consistent across the transactions. In some implementations, the system may include multiple templates. In some implementations, template selection for a transaction may depend on transaction context, e.g., a template may be selected based on a type of the transaction, a topic of the transaction, or some other data property/attribute related to the transaction. In some implementations, a template may include another template. In some implementations, the other template may be included conditionally.

Thus, implementations generate a narrative designed to objectively capture pre-identified information about the transaction (e.g., an interaction or multiple interactions) in a consistently organized manner. Because the classifiers make objective determinations about the transaction, the automatically generated narratives are more consistent across all interactions, i.e., do not reflect the subjective observations of an agent. Moreover, the consistency of the narratives ensures completeness and improves quality and readability and can be used to ensure compliance with internal or external rules and regulations. Finally, basing the narratives on the output of the classifiers enables the narratives to include data human agents may be unable or unwilling to include.

Implementations also include several novel classifiers, which can be used in generating an automated narrative, but may also be used independently of an automated narrative. The novel classifiers operate using, among other things, transaction metadata generated for the transaction as features. For example, implementations may include an emotional intelligence classifier. The emotional intelligence classifier looks for the presence or absence of empathy and also considers whether empathy was required. Such a classifier may indicate emotional intelligence is present when empathy was required and was given, or when empathy was not required and was not given. If empathy is required but not given or was not required but was given, the emotional intelligence score may reflect a lack of intelligence.

As another example, implementations may include an issue resolution classifier. The issue resolution classifier may analyze the interaction to determine whether any party has an action item outstanding. Human participants can often miss action items in summaries, especially mischaracterizing whether another participant considers an issue resolved. For example, an agent may consider an issue resolved because the agent took care of one of the customer's items, but the customer may consider the issue unresolved because there are other underlying issues not addressed or the customer is still waiting to receive updated information. While a company can use a customer survey to gauge whether the customer considers the issue resolved, such surveys are expensive and customers often decline to participate. Implementations provide for machine-learned analysis of the transaction to objectively predict whether all parties consider an issue is resolved or not. Thus, the issue resolution classifier provides an objective and consistent analysis of resolution and can be applied to all transactions. Understanding issue resolution from the point of view of both (all) parties helps to highlight client loyalty and employee satisfaction. Understanding issue resolution can also highlight opportunities for process and product improvement.

As another example, implementations may include a reason detector. The reason detector analyzes the transaction as a whole and labels zero to many scoring units (sentences) as including a particular reason label. Reason labels can include, for example, CONTACT (e.g., reflecting the reason the customer contacted customer service), EMPATHY (e.g., reflecting a reason that empathy is required), TRANSFER (e.g., reflecting the reason for a transfer), RESOLUTION (e.g., reflecting the resolution of the issue), etc. A reason detector can be a single class classifier that analyzes the transaction and tags appropriate scoring units as reflecting one label, e.g., CONTACT. A reason detector can be a multiclass classifier that tags appropriate scoring units as reflecting one or more labels, e.g., as CONTACT, EMPATHY, and/or RESOLUTION, appropriate).

Implementations may include user interfaces that enable users to curate or define automated narrative templates and/or to review or revise all or part of a narrative after it has been automatically generated. Implementations may work in conjunction with other systems that use the library of classifiers, for example a rubric scoring system that generates objective scores of the transaction. Implementations may operate as a service, e.g., including an application program interface that enables other systems (e.g., a CRM system or support ticketing system) to provide information about a transaction and request an automated narrative for that transaction.

Disclosed implementations improve a time consuming, inconsistent, subjective, and error prone manual process using novel structures and techniques that support and rely, at least partially, on machine learned capabilities. Producing original narrative text automatically is a non-trivial technical problem and computer-based natural language understanding represents a unique field of scientific study. Disclosed implementations represent an improvement in this field of study, using innovative natural language understanding techniques and novel structures to generate a consistent, objective, accurate, and complete narrative that reliably captures key information from unstructured text, including text representing interactions between parties where parties often talk over and interrupt each other.

DETAILED DESCRIPTION

Figure 1:
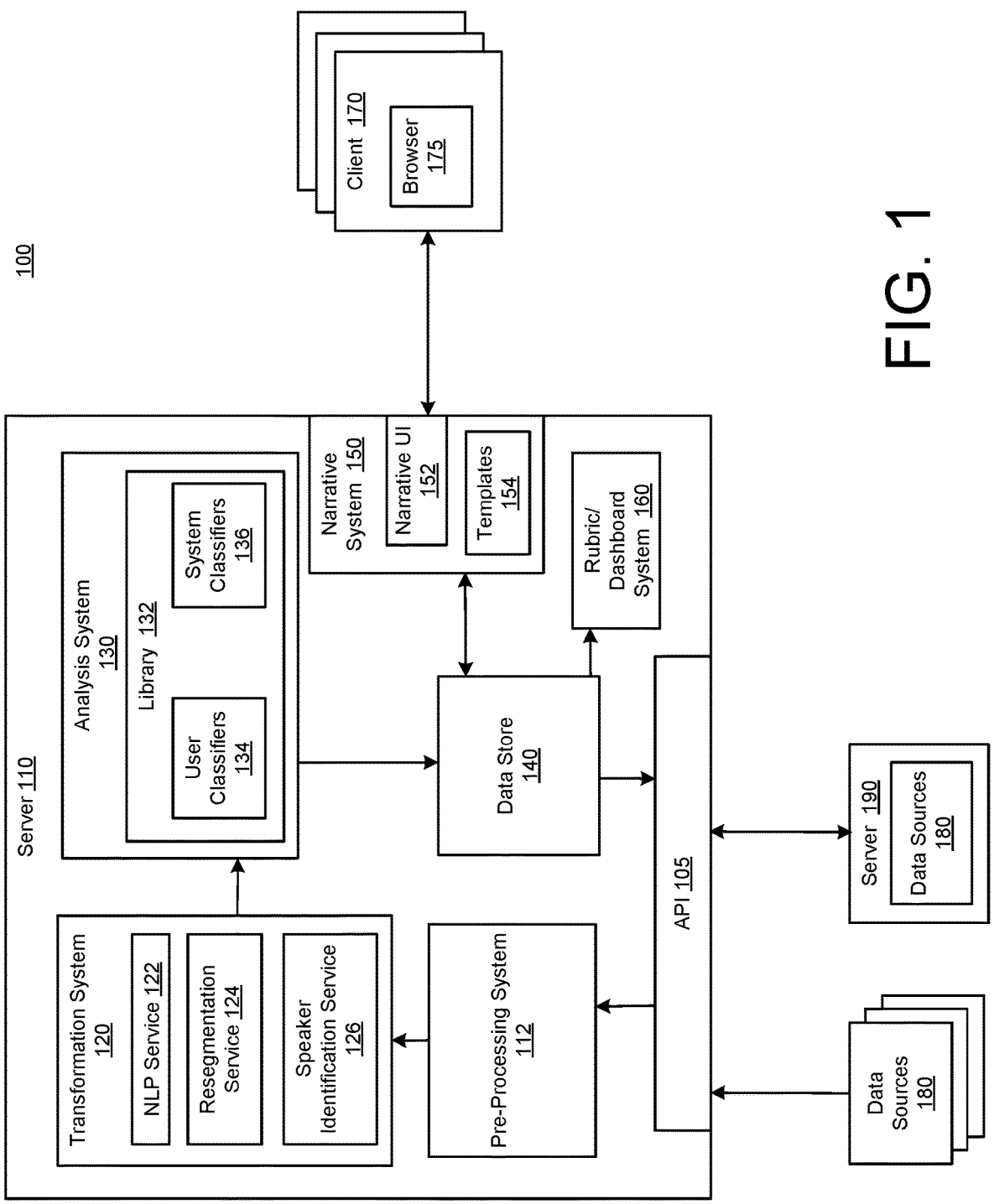
FIG. 1 is a diagram illustrating an example automated narrative system, according to an implementation.

Implementations provide a novel system for generating consistent, objective, informative, readable, targeted, and accurate narratives in real time. Many situations require or request a narrative or summary of an interaction. For example, many customer service call centers ask the customer service representatives to provide a brief summary after completing an interaction with a customer. These automated narratives can be placed in a record so that if that customer calls again, another representative can quickly determine what previously transpired. Ideally, the next representative can pick up where the previous agent left off without the customer having to explain the issue again. Similarly, a financial or health care industry customer service representative may be requested to or under internal or external obligation to summarize an interaction. However, in practice, human agents tend to write inaccurate, inconsistent, illegible, and subjective summaries, which can be useless to the next agent or to someone else reviewing the call. Additionally, such human generated summaries may not adequately serve as proof of compliance with internal or external regulations. In summary, humans often do a poor job of producing a useful, readable, consistent, and/or compliant summary.

Automating generation of a narrative summarizing an interaction is not straightforward. One approach is to provide statistical data about the interaction, e.g., the number of participants, the length of the call, the amount of time one participant spent talking, the amount of silence, etc. But statistical summaries often fail to address the desired purpose of the summary. Another approach is extractive summarization, which pulls out key sections of text and joins them back together or generates novel sentences. But extractive summarization only works decently well if the underlying text is well-structured to begin with, such as a news article or a Wikipedia page. But extractive summarization does not work well for unstructured text, which includes back and forth dialog where participants do not often speak in proper sentences, may talk over each other, and may cut each other off.

Implementations provide a different approach based on a template with non-variable text portions and one or more variable portions. Each variable portion is associated with variable replacement logic for replacing the template variable with text based on a value or values derived from the interaction. The non-variable text represents consistent structure between narratives and enhances readability. The variable portions enable a business entity to define the information that should be included in the summary and can include data fields extracted from the transaction (e.g., participant names, duration of the interaction, etc.), data generated from applying a library of classifiers to the interaction (e.g., topics discussed, specific actions identified, etc.), and/or conditional inclusion of text, other templates, and/or classifier output. Using the classifier output, implementations can capture objective conclusions about the transaction and/or about trends identified in the transaction. Thus, the template captures desired information in an objective, accurate, and complex composition of text that still makes sense and is applied consistently. Where a human agent may miss, forget, or misinterpret requested or important details, implementations provide a consistent and accurate summary of the requested information. Implementations can also provide narratives for interactions where one party is an automated or semi-automated agent, e.g., a bot or knowledge-based assistant, and there is not a human agent to provide such a summary.

Implementations also include novel classifiers that can be used to support the automated narratives, e.g., included in and/or used by the variable replacement logic, as well as to support other systems, such as an intelligent rubric, a dashboard system, etc. For example, implementations may include an emotional intelligence classifier that provides a score indicating the emotional intelligence exhibited by a participant of a transaction. The emotional intelligence may be based on analysis of individual scoring units of the transaction or over an entire transaction. Emotional intelligence reflects not only whether a particular emotion is present or absent, but also whether that particular emotion was appropriate when present or appropriately absent. For example, if a customer calls to request a password reset, an agent expressing empathy may actually anger the customer, who just wants the password reset quickly so they can get off the phone and on to other things. An emotional intelligence classifier is a machine learned algorithm trained to objectively determine whether an emotion that is present is warranted or not.

Implementations may also include an issue resolution classifier. An issue resolution classifier is a machine learned algorithm trained to predict whether transaction participants expect follow-on actions. For example, an issue resolution classifier may predict, for each participant, whether that participant considers the issue resolved or not and from the participant predictions determine a value representative of resolution. The value may be binary, e.g., resolved/not resolved. The value may not be binary, e.g., a scalar value representing a continuum of resolution. The value may be a code representing one of resolved (all participants are resolved), pending (at least one participant resolved and one not resolved), or not resolved (no participants resolved). In some implementations the issue resolution classifier may be applied to particular issues within a transaction and/or to a transaction overall.

Implementations may include a reason detector. A reason detector is a single class or multi-class machine-learned classifier trained to predict which basic scoring units, if any, in a transaction reflect a particular reason. Put another way, the reason detector analyzes the transaction as a whole and labels zero or more scoring units (e.g., sentences) with one or more of different kinds of reasons. One reason label may indicate a sentence includes or reflects the reason for the interaction (e.g., why the customer contacted customer service). One reason label may indicate a sentence includes or reflects why empathy is expected. One reason label may indicate a sentence includes or reflects the reason a call was transferred. One reason label may indicate a sentence reflects a resolution. One reason label may indicate the sentence reflects or includes the reason for a transfer. Implementations can include other reason labels. Implementations enable analysis of transactions at scale, e.g., hundreds of thousands or millions of transactions in a few minutes, which provides near real-time analysis. Such real-time analysis to determine a trend related to intensity represents a new data point not previously available to entities.

FIG. 1 is a diagram illustrating an example automated narrative system 100 for, according to an implementation. The example system 100 can be used to enable clients to develop automated narrative templates, to develop classifiers for use in the variable replacement logic included in automated narrative templates, and/or for generating automated narratives for transactions originating from various data sources. Transactions can include interactions with a customer, e.g., such as a call-center call, an instant messaging chat, a teleconference, a video conference, a survey, an email exchange with a customer, etc. Transactions can also include documents, such as user reviews, social media posts, article posts or blogs, etc. Transactions can include text, audio, or video. This list of example transactions is not exhaustive, and implementations cover any transaction that includes data relevant to an event or organization for analysis purposes.

The system 100 includes a server 110. The server 110 is a computer with at least one processor formed in a substrate, one or more operating systems and a memory or memories that store data and/or instructions that cause the server to perform specific operations. The server 110 may be implemented as a distributed computing system. The server 110 may be implemented as a mainframe. The server 110 may be implemented in a logical partition of a computer or computers, e.g., a data center, a mainframe, etc.

The server 110 may have access to data sources 180. Data sources 180 may be part of the server 110. Data sources 180 may be remote from, but accessible by the server 110. Data sources 180 be stored at a third-party server 190 and shared with the server 110. Data sources 180 may represent data from various sources, e.g., various social media platforms, data from a call center, data from an email server, data from a service, data from a news feed, etc. Thus, data sources 180 may represent very different types of sources, some of which may be remote and some of which may be local to server 110. In some implementations, the server 110 may have access to one or more data sources 180 using one or more application program interfaces (APIs) 105, which provide automated narrative generation as a service. The API 105 may include an import API and/or an export API. The server 110 may have access to one or more data sources 180 using one or more APIs provided by a third party.

Figure 10:
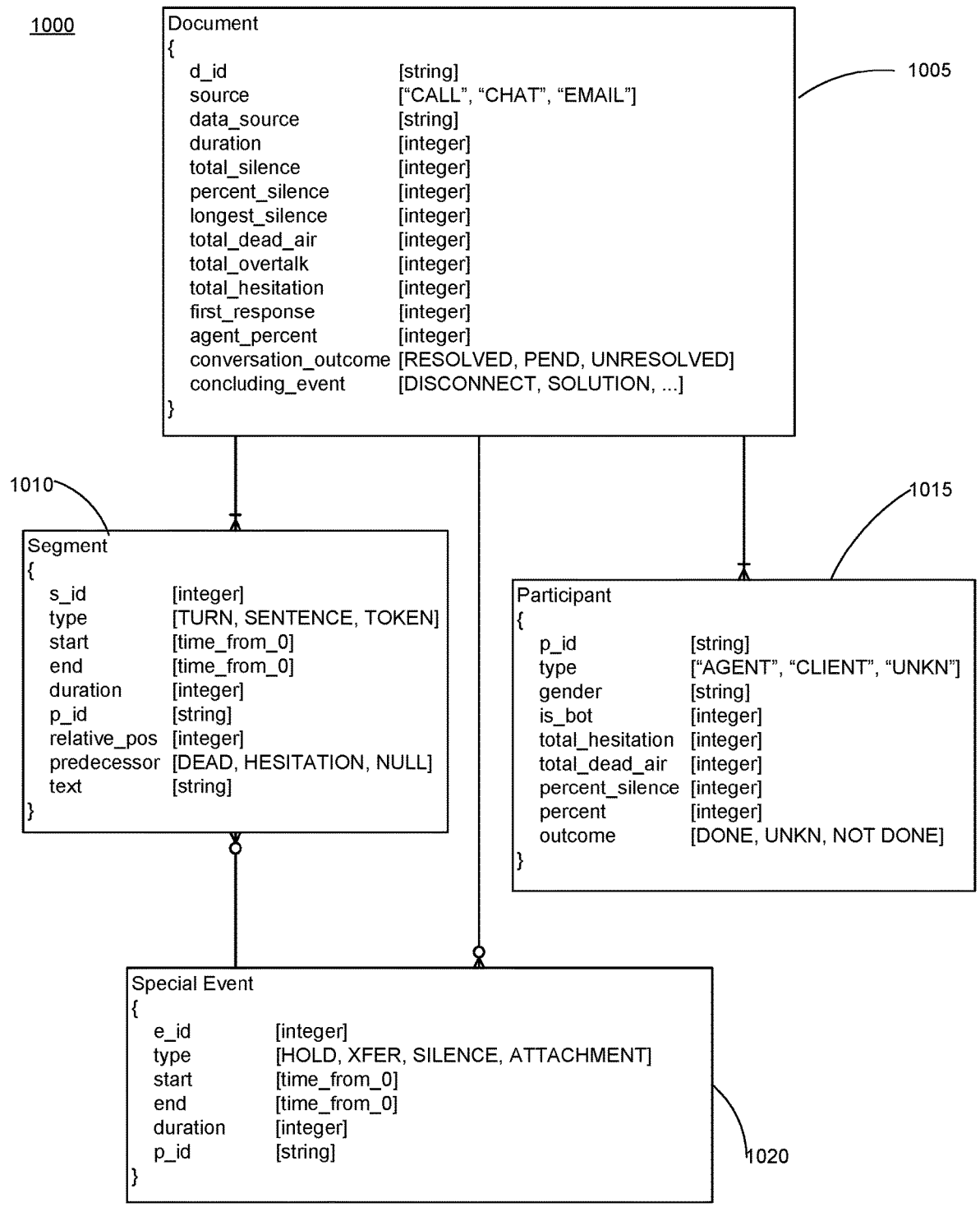
FIG. 10 is a diagram illustrating example metadata for a transaction, according to an implementation.

The server 110 may include a pre-processing system. The pre-processing system 112 may optionally be used to prepare the data from the data sources 180 for processing. For example, for data sources originating from an audio or video source (e.g., a call center, a short video recording in a social media post, etc.), the data may be transcribed into text. In some implementations, the pre-processing system 112 may include connectors that map attributes of a particular data source to a unified data scheme. The pre-processing system 112 may generate and store metadata describing attributes for a transaction. Transaction attributes can include attributes describing the overall transaction, attributes describing participants, attributes describing a verbatim, attributes describing a sentence, etc. A transaction attribute can be any data extracted from or metadata about a transaction. FIG. 10 illustrates some example transaction attributes (metadata) that the pre-processing system 112 may generate. Implementations can include other similar transaction attributes. Other similar types of pre-processing may be done by the pre-processing system 112.

The server 110 may include a transformation system 120. The transformation system 120 may be configured to transform the information from the data sources into a format that can be processed by the analysis system 130. In some implementations, the transformation system 120 is configured to convert large spans of text into component elements. In some implementations, transformation system 120 may include natural language processing (NLP) service 122. The NLP service 122 may use machine learning and rules-based components to execute language detection, tokenization, lemmatization, normalization, morphological analysis, part of speech tagging, named entity recognition, syntax parsing, anaphora resolution, and clause detection tasks against the text associated with one transaction (e.g., a call transcription, an instant message conversation, a social media post). Thus, the NLP service 122 may break (e.g., parse) the text into scoring units and/or may adjust the scoring units identified during pre-processing. The scoring units may be sentences. The NLP service 122 may tag parts of speech within sentences and/or add other metadata tags.

The transformation system 120 may also include resegmentation service 124. The resegmentation service 124 may combine small scoring units (e.g., sentences) into meaningful ones for improved analysis. For example, the resegmentation service 124 may combine the two sentences "okay. I got it." into "okay, i got it", including updating the metadata (attributes) of the sentences calculated during preprocessing. In some implementations, the transformation system 120 may include speaker identification service 126. The speaker identification service 126 may identify a speaker for each component element, e.g., each sentence. Thus, for example, a transaction from a call center may include two participants; an agent and a customer and the speaker identification service 126 may associate each sentence with one of the two participants. In some implementations, the speaker identification may be performed during pre-processing. In some implementations, speaker identification may have been provided by a transcription service. Some of the classifiers may be applied only to one type of speaker. In some implementations the functions of the NLP service 122, the resegmentation service 124, and the speaker identification service 126 may be included in a single service or module or may be broken out differently that described with regard to FIG. 1. In some implementations, some of the transaction metadata, e.g., described in FIG. 10, may be added as part of the transformation system. In some implementations, the transformation system 120 may perform other operations needed to prepare the text of the transaction for scoring, using known or later developed techniques. In some implementations, not all of the described services are applied to a transaction.

The server 110 may include an analysis system 130. The analysis system 130 may be configured to analyze the scoring units of the transformed text to look for certain elements. The analysis system 130 may apply a classifier library 132 to the transformed text. The classifier library 132 may include one or more user-generated classifiers 134. The user-generated classifiers may include rule-based classifiers. A rule-based classifier tests for the presence or absence of a particular condition in the transaction. For example, the user may provide a sentence, a phrase, (and optionally acceptable variants) for the analysis system 130 to search for in the scoring units of the transformed transaction. In some implementations, the server 110 may include an interface, e.g., narrative UI 152, that enables a user to enter rule-based user classifiers 134. In some implementations the server 110 may include a user interface for training a machine-learned or rules-based user classifier.

The classifier library 132 may include one or more system classifiers 136. The system classifiers may include rule-based classifiers. The system classifiers may include machine-learned classifiers. Example classifiers include a sentiment classifier, a reason detector, an intent detector, effort scoring, an emotion detector, an emotional intensity classifier, an empathy detector, an issue resolution detector, a topic detector, span detection, a profanity detector, a named entity recognizer, an emotional intelligence classifier, etc. In some implementations, named entities identified by the named entity recognizer may include emails, phone numbers, events, emojis, currencies, units of measure, events, etc. In some implementations, named entities may include products, brands, companies, industries, people, etc. In some implementations, the analysis system 130 may perform topic analysis. In some implementations, topic analysis, or categorization, may use Boolean queries, e.g., Lucene-based Boolean queries. In some implementations, a user can define queries based on keywords, phrases, proximity, linguistic relationships or structured data. These queries may represent individual semantic topics that are structured into hierarchical taxonomies. In some implementations, topics may be assigned at the sentence level (e.g., a transaction scoring unit). In some implementations, each sentence can have multiple topics assigned. In some implementations, topic analysis may be performed on scoring units tagged as including the reason for the call (e.g., via a reason detector). The analysis system 130 applies applicable classifiers to a transaction. A transaction is a collection of scoring units. Scoring units may be identified by the transformation system. A scoring unit can also represent a collection of other scoring units. For example, a paragraph scoring unit may include multiple sentence scoring units. As another example, a dialog turn scoring unit may include multiple utterance scoring units. Similarly, where a transaction represents several interactions (e.g., several calls an agent participated in over a week), each interaction may be a scoring unit that represents multiple dialog turns.

The server 110 may include narrative system 150. Narrative system 150 generates automated narratives for a transaction using the output of the analysis system 130 and the transformation system 120. Narrative system 150 automatically generates the narrative by replacing template variables in a template with enhancements generated for the transaction, e.g., by analysis system 130 and/or transformation system 120. A template 154 is a combination of non-variable text and one or more template variables. A template variable is associated with variable replacement logic that determines what enhancement replaces the template variable in the automated narrative template. The variable replacement logic can identify a field, which results in the narrative system 150 replacing the template variable with a value for that field. For example, if the identified field is a name of an agent participant in the transaction, the template variable is replaced with the name of the agent. The variable replacement logic can identify a classifier output, which results in the narrative system 150 replacing the template variable with the result of the application of the classifier to the transaction. For example, the variable replacement logic may identify a reason detector, which results in the narrative system 150 replacing that template variable with a label that corresponds to the classifier output. The variable replacement logic can also include conditional logic. For example, the variable replacement logic may indicate that if the issue resolution classifier indicates no resolution, the text "An issue is outstanding." may replace the template variable in the automated narrative template. In some implementations, the conditional logic may result in the inclusion of another automated narrative template. Thus, for example, if a customer service call was transferred, a call transfer template may be inserted and evaluated so that the template variables in the call transfer template are replaced according to their respective applicable variable replacement logic.

In some implementations, the narrative system 150 may include summary user interface (UI) 152. The narrative UI 152 may enable a user, e.g., using client 170, to generate or edit new summary templates 154. For example, the narrative UI 152 may enable a user to select one or more sources for the transactions, e.g., from data sources 180. The narrative UI 152 may enable a user to select a subset of transactions from one or more of the data sources 180, e.g., to select only email communications, to select only transactions relating to product returns, or customer service calls for customers having a certain status. Such criteria may be referred to as summary selection criteria. The summary user interface 152 may enable a user to enter the static text for the template, i.e., the text-based portion. The summary user interface 152 may enable a user to enter the variable replacement logic for a variable portion, i.e., one of the template variables. For example, the selection UI 152 may enable the user to select a data item (field, classifier output) used to replace the variable with a value, conditional logic to select text for replacing the variable, conditional logic to insert another template, conditional logic to select a data item used to replace the variable, etc.

The narrative UI 152 may enable a user to edit a narrative generated for a transaction. For example, a few seconds after an interaction ends, a user may be presented with the generated narrative and be able to edit it, if necessary. The narrative UI 152 may enable a user to edit designated portions of an automated narrative generated for a transaction. For example, some portions of the automated narrative may be locked and not available for edit while other portions may be designated as editable (e.g., the topic of a call, for example). In some implementations, the edits may be included in a feedback loop that helps improve (e.g., retrain) one of the classifiers. The narrative UI 152 may enable a user to generate user classifiers 134. The classifiers may be Boolean queries, e.g., Lucene-based Boolean queries. Such queries search for one or more keywords in a transaction scoring unit and may use wildcard matching and/or proximity matching. The classifier may be a rules-based classifier or a machine learned classifier. Such a user interface may enable a user to provide the query elements for the classifier.

The server 110 may include other systems that use the output of the analysis system 130. Such systems can provide data items used in the variable replacement logic, e.g., to replace a template variable or used in conditional logic. For example, the server 110 may include a rubric/dashboard system 160. The rubric/dashboard system 160 may support a customized scoring process that uses the output of the classifier library 132 applied to a transaction to identify the presence or absence of specified criteria in the transaction. Put another way, the rubric/dashboard system 160 may enable a user to define (generate) a rubric against which a transaction or set of transactions are scored. In some implementations, a component of the score may represent a decision on whether something occurring in the transaction needs further attention. The rubric provides a prioritization framework that synthesizes complex rules, represented by the classifiers and weights, as defined by the rubric, into a simple objective score. This objective score, or some combination of scores (e.g., from transactions for an agent over a time frame), can be used as a data item in the variable replacement logic. The rubric/dashboard system 160 may also provide aggregated views of some of the data in the data store 140. As one example, disclosed implementations may provide an aggregated view of rubric scoring for an agent, for a department, for all agents under a supervisor, across a topic, etc. Some implementations may enable users with different roles in the organization access to different aggregated views.

Figure 8:
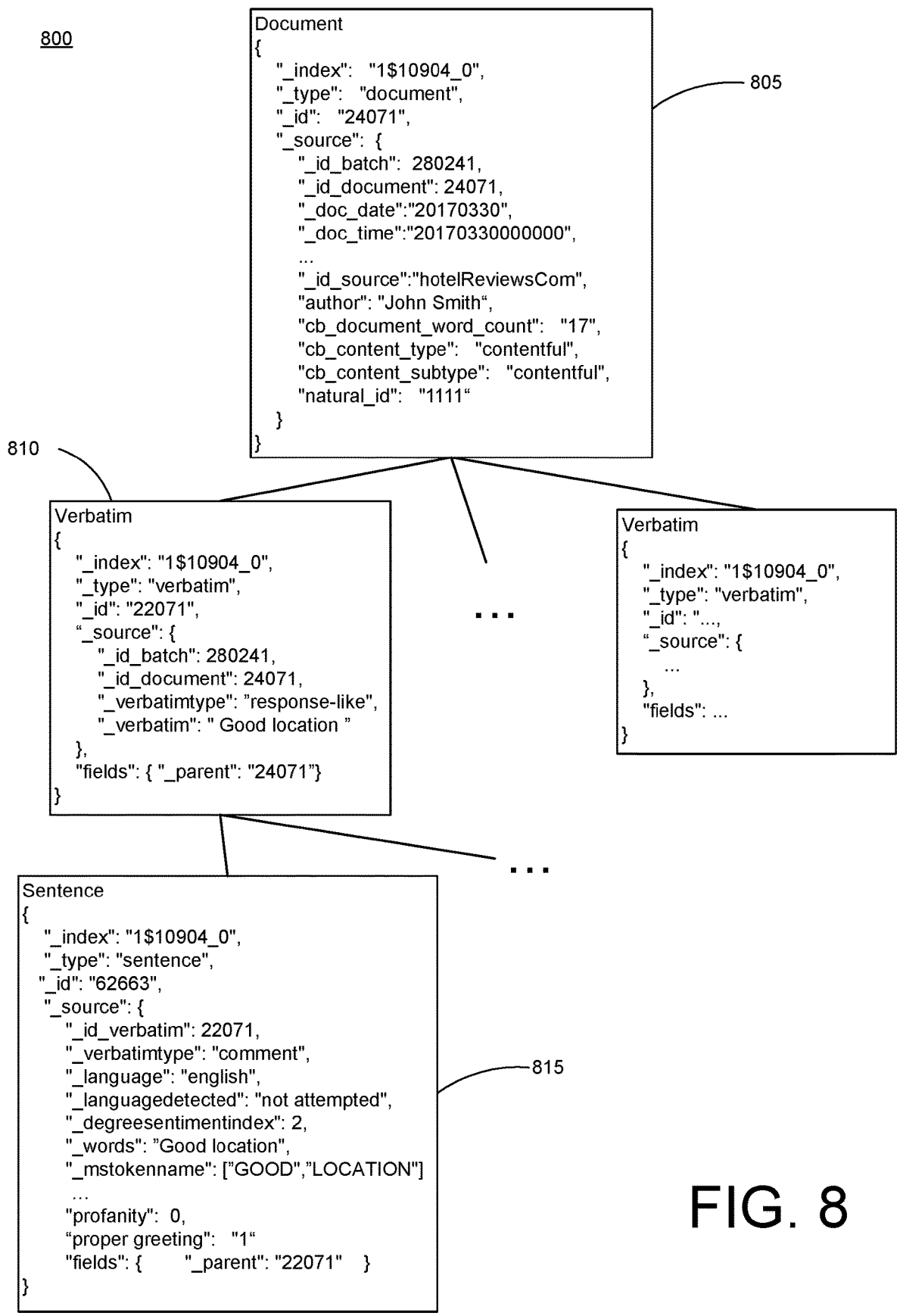
FIG. 8 is a diagram illustrating an example record in a transaction scoring data structure, according to an implementation.
Figure 9:
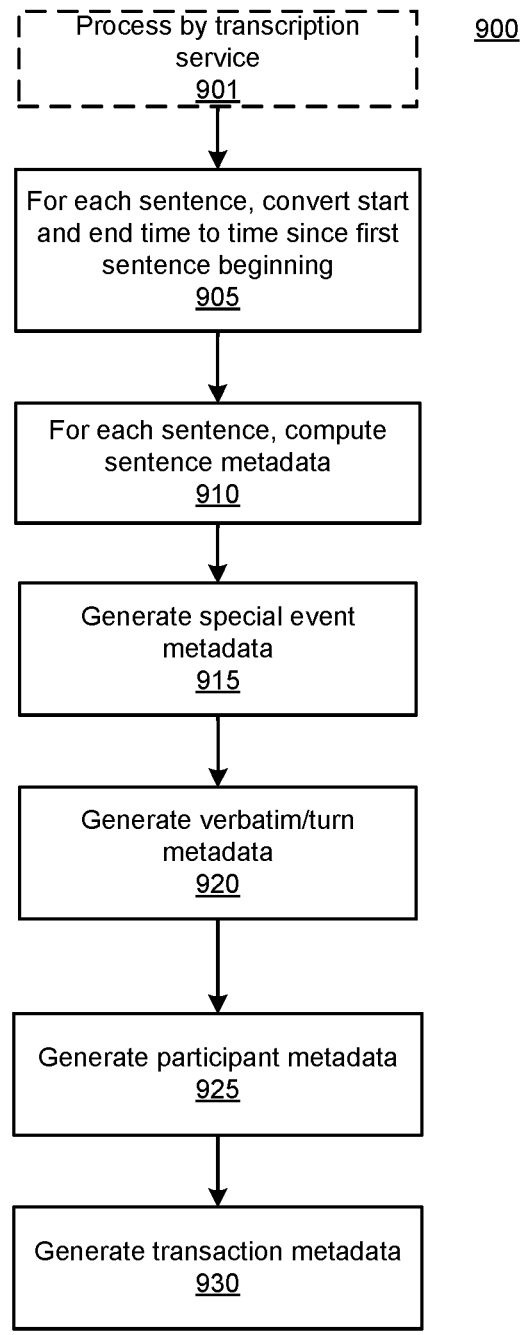
FIG. 9 is a flow diagram illustrating an example process for generating the transaction metadata, according to an implementation.

The server 110 may include data store 140. Data store 140 represents a memory or memories storing data structures that support the functionality of the various components of server 110. The data store 140 may represent several different data structures. In some implementations, some of the data structures in the data store 140 may be remote from, but accessible by, the server 110. In some implementations, one or more of the data structures may be distributed data stores. In some implementations, one or more of the data structures may support customer relations management (CRM) functions. In some implementations, the data store 140 may store the result of one or more of the pre-processing, transformation, or analysis of a transaction. FIGS. 8 and 9 are examples of data structures that may be included in data store 140 to support intelligent generation of automated narratives in a customer service environment. In some implementations, the data store 140 may store the templates 154.

One or more of the elements of the server, such as pre-processing system 112, transformation system 120, analysis system 130, narrative system 150, and/or rubric/dashboard system 160, may be implemented as software, hardware, firmware, or a combination of these. Further, although illustrated as part of server 110, one or more of the elements may be performed by another computing system communicatively connected to the server 110. Thus, implementations include arrangements not specifically illustrated in FIG. 1. Additionally, while a call center has been used for ease of discussion to describe an environment for the server 110, this is only one example environment and implementations include any environment that enables users, e.g., of client 170, to generate and customize classifier library 132 and to curate an automated narrative for non-structured transactions, including systems that provide data visualizations, dashboards, etc.

The system 100 may also include one or more clients 170. The client 170 represents a personal computing device, such as a PC, a laptop, a tablet computer, a smart phone, a smart television, a wearable device, etc. A user may use the client 170 to access the user interfaces provided by the server 110. For example, the client 170 may include a browser 175 that enables the user, via client 170 to receive information from the server 110 and to provide information to the server 110. The client 170 and the server 110 may communicate over a network, such as the Internet or an intranet.

Figure 2:
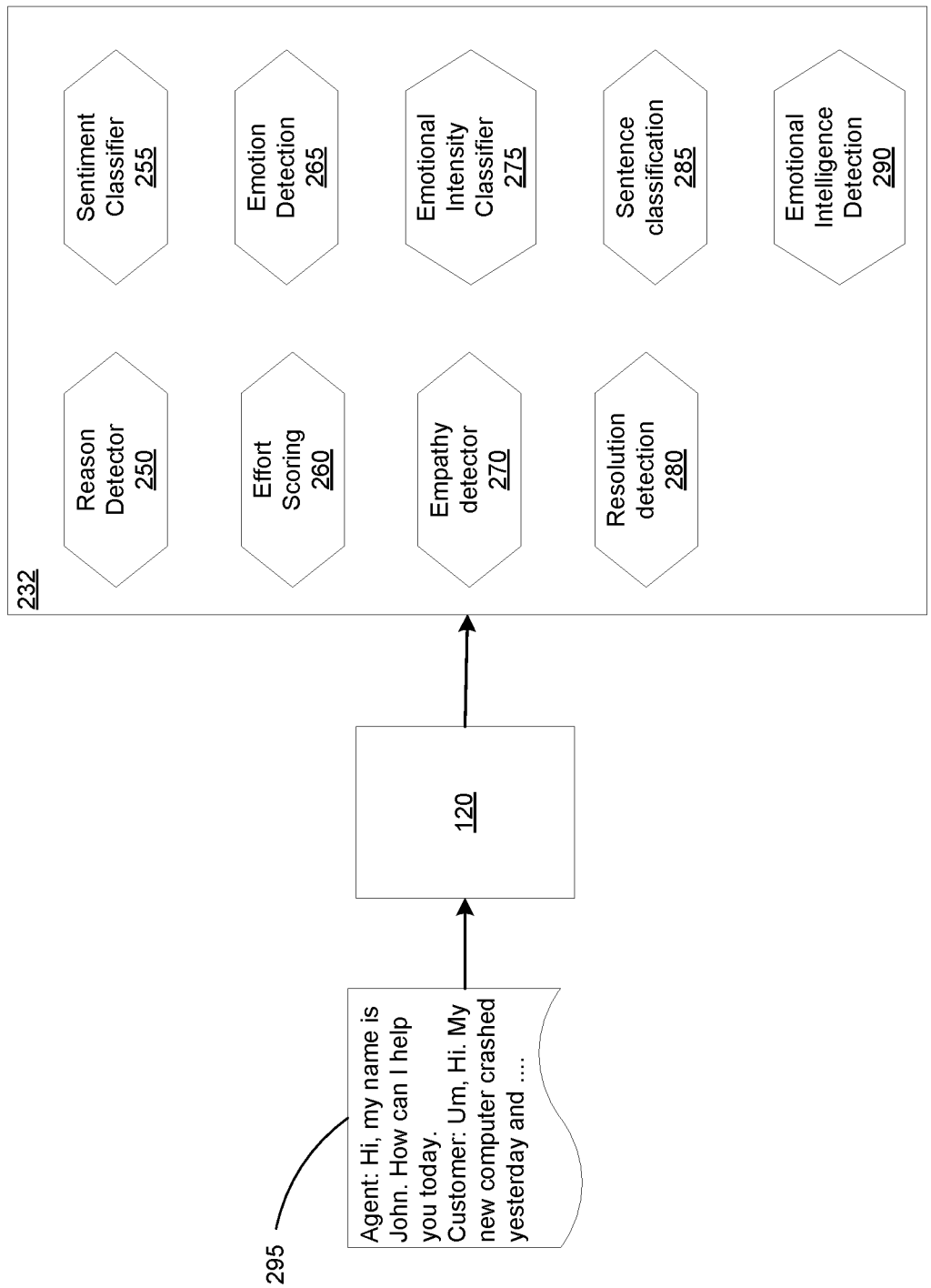
FIG. 2 is a diagram illustrating classifiers in an example library used by an automated narrative system, according to an implementation.

FIG. 2 is a diagram illustrating classifiers in an example classifier library 232 used by an automated narrative system, according to an implementation. The classifier library 232 of FIG. 2 is one example of classifier library 132 of FIG. 1. In addition, FIG. 2 illustrates an example transaction 295 from a data source. In some implementations, the classifier library 232 operates on hundreds, thousands, or even millions of such transactions on a daily basis. Thus, classifiers in the classifier library 232 need to operate at scale and cannot practically be performed by a human. In the example of FIG. 2 the transaction 295 is a customer call to an entity's call center. The transaction 295 is processed, e.g., by the transformation system 120 of FIG. 1, to identify scoring units. In this example, the scoring units are sentences from the call. The scoring units are each associated with one of two verbatims, Agent or Customer. Some classifiers may only apply to certain verbatims, e.g., an empathy detector may only be applied to the Agent's verbatims. Even if a classifier is applied to every scoring unit, some summary templates may only use the score from scoring units for certain speakers, e.g., a sentiment classifier may be applied to all scoring units but a template variable may use only sentiment from verbatims from the customer.

The classifier library 232 of FIG. 2 includes several example classifiers. A reason detector 250 may identify/tag a scoring unit as including a reason for the transaction. In some implementations, this scoring unit may be used as the reason for the call, e.g., in a template or rubric. In some implementations, this scoring unit may be further analyzed, e.g., by a topic classifier or other topic detector, to identify one or more of several predefined reasons (topics) identified in the scoring unit. In some implementations, the reason detector 250 may include a Boolean query, e.g., looking for certain keywords or combinations of keywords, which may or may not be in proximity to each other or to other keywords. In some implementations, the reason detector 250 may output an identified scoring unit, a topic, or both. In some implementations, one or more reason detectors 250 may be user-defined. In some implementations, one or more reason detectors 250 may be machine learned. In some implementations, a summary template may include a template variable replaced with a detected reason or reasons. In some implementations, a summary template may only apply to transactions tagged with prespecified reasons. In some implementations, the presence of a particular reason may be a branching criterion in variable replacement logic for a template variable.

The classifier library 232 may include a sentiment classifier 255. The sentiment classifier 255 may tag a scoring unit with one or more sentiment tags. In some implementations, a sentiment tag may indicate positive sentiment or negative sentiment. In some implementations, a summary template may include variable replacement logic that replaces a template variable with the detected sentiment or uses a detected sentiment to include specific text or another template in the summary. The classifier library 232 may include an emotion detection classifier 265. The emotion detection classifier 265 may tag a scoring unit with one or more predefined emotions, e.g., anger, frustration, gratitude, etc. In some implementations the emotion detection classifier 265 may tag a scoring unit as either expressing or not expressing an emotion. In some implementations, the emotion detection classifier 265 may be a machine-learned classifier. The effort scoring classifier 260 may tag a scoring unit with one or more predefined effort tags. The effort tag may represent how hard/frustrating or how easy/enjoyable a speaker found a task, an interface, a process, etc. Such as tag can be used to include another template, e.g., including an additional summary template if the score is less than zero and a different summary template if the score is zero or greater, e.g., a template that relates to apologies or increased empathy when a transaction has high effort on the part of a customer.

The classifier library 232 may include an empathy detector 270. An empathy detector 270 may tag a scoring unit as expressing empathy. In some implementations this may be a machine learned classifier. In some implementations the empathy detector 270 may tag a scoring unit as either expressing empathy or not expressing empathy. In some implementations, only scoring units associated with a particular speaker (e.g., an agent rather than a customer) may be analyzed by the empathy detector 270.

The classifier library 232 may include an emotional intensity classifier 275. An emotional intensity classifier 275 may give a score indicating how strong an emotion is, irrespective of the actual emotion expressed. In some implementations the emotional intensity classifier 275 tags a scoring unit as having low intensity, medium intensity, or high intensity. In some implementations, the tags may be a numeric value. The emotional intensity classifier 275 may be a machine learned classifier. In some implementations, the emotional intensity classifier 275 may be trained on curated training data. The curated training data may be labeled as either including an emotion and, if labeled as including an emotion, the training data may further be labeled as either intense or not intense. The emotional intensity classifier 275 may have a confidence level associated with whether the classification is intense or not intense. In some implementations, when the trained model is used at inference, the confidence level may be used to determine whether a scoring unit is scored as having low, medium or high intensity. For example, a high confidence that the scoring unit is intense may result in the scoring unit being considered high intensity. A low confidence that the scoring unit is intense may result in the scoring unit being considered low intensity. A confidence score in a middle range may result in the scoring unit being considered medium intensity.

The classifier library 232 may include a resolution detection classifier 280. A resolution detection classifier 280 may be a machine-learned classifier trained to indicate whether or not a transaction includes remaining actions, e.g., for either a customer or an agent. If any participant in the transaction has a follow-up item, the transaction is not resolved.

The classifier library 232 may include one or more sentence classifiers 285. A sentence classifier 285 may tag a scoring unit as one or more types of predetermined sentence types. For example, one sentence classification may tag a sentence as including a mini Miranda warning and/or as including a proper greeting, etc. One or more of the sentence classifiers 285 may be set up/generated by the user.

The classifier library 232 may include an emotional intelligence detection classifier 290. The emotional intelligence detection classifier may take as input the output of the empathy detector 270 and determine whether the empathy was needed or not needed. The output may be an indication (e.g., binary value or scalar value) of appropriate use of empathy. In some implementations, the emotional intelligence detection classifier 290 may provide an indication of whether other emotions are appropriate given the context of the transaction. The classifiers illustrated in library 232 are examples of the various types of classifiers that may be included in disclosed implementations and implementations can include other types of classifiers.

Figure 3:
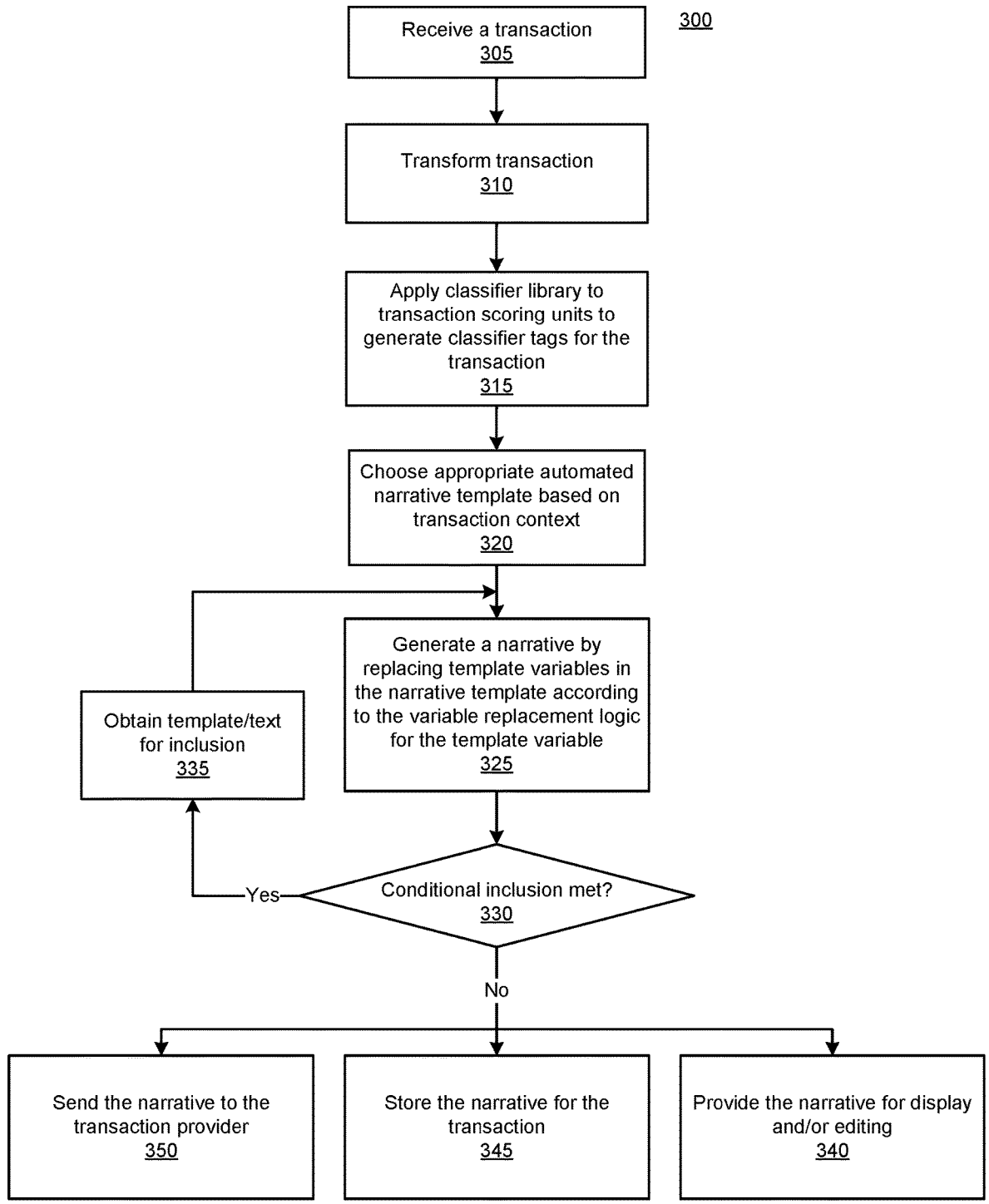
FIG. 3 is a flow diagram illustrating an example process for generating an automated narrative, according to an implementation.

FIG. 3 is a flow diagram illustrating an example process 300 for generating a narrative summary, according to an implementation. Process 300 may be performed by an automated narrative system, such as system 100 of FIG. 1. Process 300 uses the output of a library of classifiers in conjunction with a summary template to generate a readable, consistent, objective, and accurate narrative summary of the transaction. Process 300 may begin in response to receipt of a transaction 305. The transaction may represent one interactive communication, e.g., a phone call, a meeting. The transaction may represent multiple interactive communications, e.g., chat sessions occurring between one particular agent and customers over a period of time (e.g., a week). The transaction may represent an email chain occurring over several days and including several different participants, etc. The transaction can be from any data source. Example transactions include a survey response, a social media post, a customer review, an instant message chat session, a call transcript, an email chain, a record from a customer relations database, a news article, a blog post, etc.

The system may transform the transaction (310). As part of transforming the transaction, the system may identify scoring units. In some implementations, a scoring unit represents a span of text, such as a sentence or paragraph. A scoring unit may be any data on which a classifier in the classifier library operates. In some implementations, different classifiers may operate on different scoring units. For example, some classifiers may operate on a sentence and another classifier (e.g., a timeliness classifier that tags a transaction as being timely or not timely) may operate on the overall transaction. Transforming the text may also include resegmenting some of the text. Resegmentation may combine small scoring units into larger scoring units for improved analysis. Transforming the text may also include speaker identification, where a transaction includes more than one speaker. Speaker identification service associates a speaker for each scoring unit. Speaker identification can be a generic role identification, e.g., "customer" or can identify a specific employee, agent, contractor, etc.

The system may apply one or more classifiers from the classifier library to the scoring units and score the transaction to generate classifier tags for the transaction (315). The classifiers applied to a transaction may be based on the transaction context, e.g., the type of transaction, the type of scoring unit, the speaker (participant) (e.g., to sentences associated with a "customer" role or to sentences not associated with a "customer" role), etc. In some implementations, all classifiers in the library may be applied to the transaction. Application of the classifiers results in at least some of the scoring units receiving one or more tags. A tag may indicate the type, class, topic, presence of an attribute, absence of an attribute, etc. In some implementations, the system may aggregate some of the scoring units for a transaction. For example, if one or more scoring units associated with an agent are tagged as including profanity, the entire transaction may be tagged as including profanity. The system may apply variable replacement logic against the transaction as a whole and/or against scoring units. The classifier tags may be stored (e.g., in data store 140) and may be used by other processes (e.g., rubric scoring, reporting and/or trend analysis).

In some implementations, the system may select an appropriate automated narrative template (320). In some implementations, only one summary may exist. In some implementations, the summary template may be selected based on transaction context. For example, the transaction may meet some selection criteria for the summary template, such as a template applied only to transactions for customers who have signed up for a loyalty program, or a template applied only to transactions relating to a particular topic, such as new account setup or password resets. In some implementations, the system may select more than one automated narrative template for the transaction. In other words, in some implementations, a transaction may meet the selection criteria for multiple narrative templates and an automated narrative generated for each template. The remaining steps of process 300 would then apply to each template separately, although the templates may be concurrently processed by the system.

The system then generates an automated narrative by replacing the template variables in the narrative template according to the variable replacement logic associated with variable (325). The automated narrative template is a combination of non-variable text and template variables. Each template variable is associated with variable replacement logic. The variable replacement logic defines how a template variable is replaced. The variable replacement logic can be simple, e.g., identifying a field name, which results in replacement of the template variable with a value of that field for the transaction. The variable replacement logic can identify the output of a classifier, which results in replacement of the template variable with a value based on the classifier tag generated by applying the classifier to the transaction. The variable replacement logic can identify an additional template, which replaces the template variable with the content of the additional template. The variable replacement logic can include conditional logic, e.g., including a template, text, a field value or a classifier tag if some condition is true. The conditions themselves may use (be based on) variables, e.g., evaluating whether profanity is used and, if so, including another template or specific text. Thus, the system evaluates any conditions in the template (330) and if a condition is met (330, Yes), the additional template, text, or template variable is included in the narrative (335). Inclusion of another template or template variable may cause step 325 to be repeated. When no additional conditional inclusions remain (330, No), the system has generated the automated narrative for the transaction.

In some implementations, the automated narrative may be provided to a requestor, e.g., the system from which the transaction was obtained (350). For example, process 300 may be provided by the system as a service where a requestor provides the transaction and receives, in return, the automated narrative for the transaction. In some implementations, the system may store the automated narrative (345), e.g., in data store 140. Thus, the automated narrative may become a data item stored for the transaction. In some implementations, the system may provide the automated narrative for display and/or editing (340). For example, in some implementations a user may be able to edit the summary, or parts of the summary, before it is stored (345) or sent to the requestor (350). In such implementations, the narrative template may include markup that indicates which portions or the narrative are editable. The markup is not included in the visible text of the summary. In some implementations, the automated narrative may be both provided to a requestor and stored. Process 300 then ends.

Figure 4:
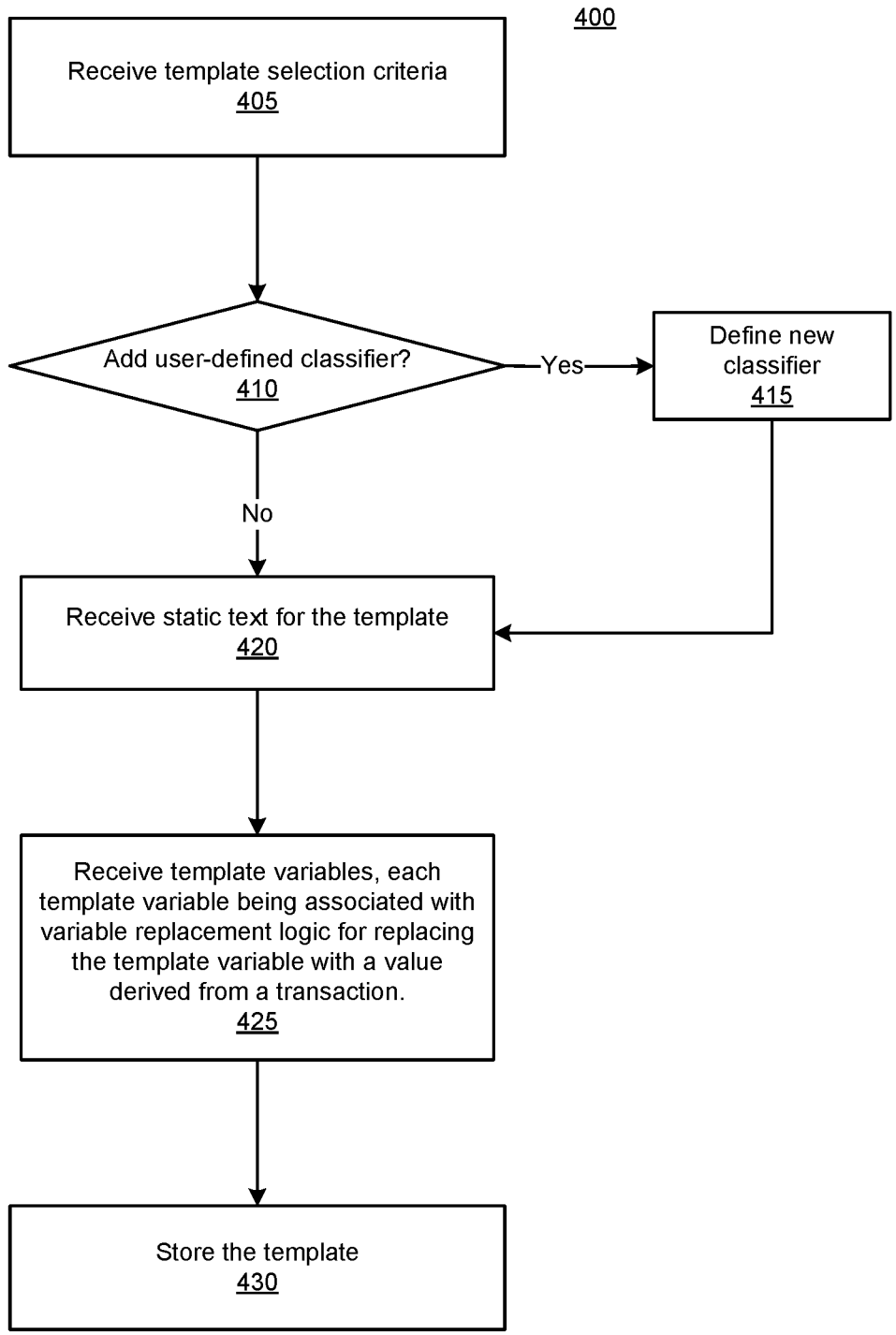
FIG. 4 is a diagram illustrating an example process for establishing an automated narrative template, according to an implementation.

FIG. 4 is a diagram illustrating an example process 400 for establishing an automated narrative template, according to an implementation. Process 400 may be performed by an automated narrative system, such as system 100 of FIG. 1. Process 400 enables a user to define an automated narrative. Process 400 may be used to define multiple different narratives. Process 400 may begin by receiving template selection criteria (405). Template selection criteria may define the context in which a narrative template applies. For example, template selection criteria may indicate an automated narrative template applies to a specific transaction source. Thus, the template selection criteria may include identification of a data source or multiple data sources. In some implementations, no data sources are identified and it is assumed that the template selection criteria applies to transactions from any data sources the system processes.

Template selection criteria may indicate a narrative template applies to transactions with a specific context, e.g., found to include a specific tag, e.g., from one of the classifiers or found to mention or include references to selected keywords, terms, hashtags, etc. In other words, Template selection criteria may indicate a narrative template applies to a specific type of transaction and/or may apply to a transaction tagged with a particular tag. Thus, the template selection criteria may include identification of attributes or characteristics that a transaction from an identified data source must have. For example, template selection criteria may identify text, such as keywords, terms, hashtags, etc. (including stems and/or lemmatizations), that appear in a transaction from a selected data source. Thus, for example, a narrative template may apply to social media posts mentioning a specific product, a company, an event, a hashtag, etc. The template selection criteria may identify attributes of a speaker of the transaction. For example, a customer contacting a help desk may identify as being from a certain company or may provide a member number. Implementations may be able to identify transactions from members with certain characteristics, e.g., a platinum level member, etc. The template selection criteria may identify a particular tag. For example, the template selection criteria may indicate that the narrative template is used for transactions tagged as including a particular topic or reason, e.g., from reason detector 250. In some implementations the template selection criteria is optional, e.g., the narrative template applies to all transactions, regardless of data source or content.

As part of defining the automated narrative template, the user may use any combination of classifier output, including newly defined classifiers. Accordingly, in some implementations, a user may indicate a new classifier is needed (410, Yes). The system may provide the user with the opportunity to define the new classifier or multiple new classifiers (415). Such new classifiers may be saved, e.g., in a classifier library. In some implementations, adding a new classifier may include providing a model, i.e., a trained machine-learned classifier. The system may then enable the user to provide the text portion of the narrative template (420). The text portion represents static text, or in other words non-variable text that is the same for each narrative generated using the automated narrative template. The system may also receive one or more template variables (425). Each of the template variables is associated with its own variable replacement logic. The variable replacement logic associated with a variable defines how the template variable is replaced with a value derived from the transaction. The variable replacement logic is explained in more detail with regard to FIG. 3 and FIGS. 5A and 5B. Once the static text and the template variables are entered, the narrative template is stored, e.g., as one of templates 154 (430) and process 400 ends.

Figure 5A:
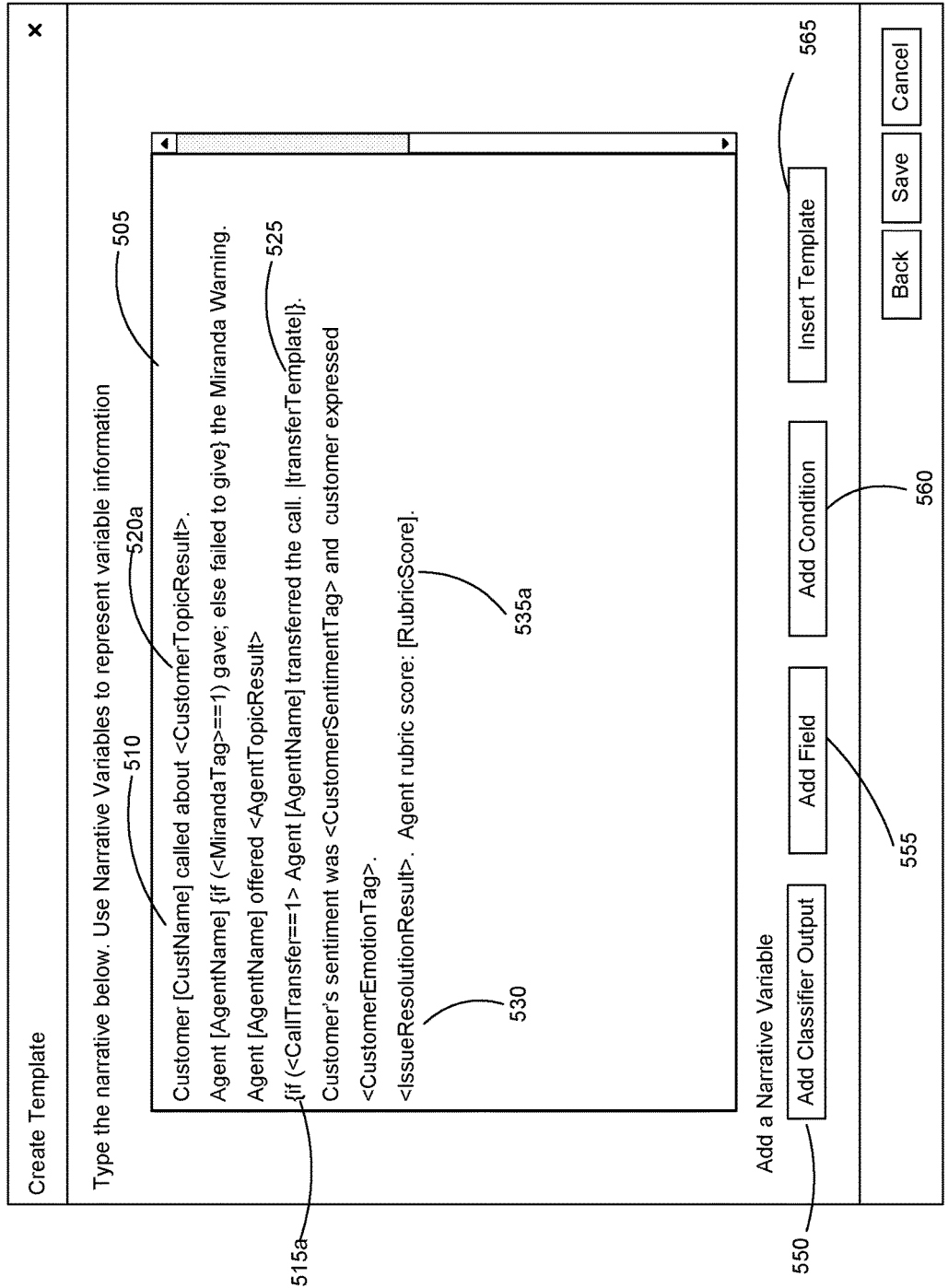
FIG. 5A is a diagram illustrating an example user interface for constructing an automated narrative template, according to an implementation.

FIG. 5A is a diagram illustrating an example user interface 500 for constructing an automated narrative template, according to an implementation. The example user interface 500 of FIG. 5A provides an example of an automated narrative for an interaction between a call center agent and a customer and is presented for illustration purposes only; implementations are not limited to call center interactions or to the specific template variables and template text depicted. Some implementations may not have a user interface 500 and templates may be generated using any text entry interface (e.g., by a system developer). User interface 500 demonstrates the flexibility disclosed implementations provide in identifying information considered helpful in a narrative summary and in distilling that information into a consistent, readable, narrative summary. The user interface 500 may include template input window 505. The input window 505 enables a user to compose the narrative, including entering the non-variable (static) text portions. The non-variable text portions remain consistent for automated narratives generated using the template, which increases consistency across narratives and ensures readability and organization.

While the template input window 505 may enable direct input of the static text portions directly, in some implementations, variable portions may be entered directly or by using variable controls. The example interface 500 includes four variable controls. Control 550 adds a template variable with variable replacement logic for a classifier output. Control 555 adds a template variable with variable replacement logic relating to a transaction field. Control 560 adds a template variable with conditional variable replacement logic. Control 565 adds a template variable with variable replacement logic relating to inclusion of another template. In some implementations, one or more of the variable portions may be entered directly into the template input window 505. In such an implementation, interface 500 may have fewer input controls. Implementations can also have additional variable controls.

In the example of FIG. 5A, the type of template variables Template variable 520$a$ is one example of a template variable with variable replacement logic relating to a classifier output. In the example of FIG. 5A, template variables use a different format to indicate the different types of enhancement logic. For example, the template variable 520$a$ is enclosed by angle brackets, i.e., < >. In the example of FIG. 5A the angle brackets enclose an identifier for a classifier, e.g., a classifier tag or classifier output. In some implementations, the classifier identifier may identify logic for interpreting classifier tags, e.g., assigning text to a numerical output. In some implementations, a user may type the template variable 520$a$ directly into the template input window 505. In some implementations, the user may use an interface initiated by control 550 to add template variable 520$a$ to the narrative template. The example of FIG. 5A also includes a template variable 530$a$, which is also associated with variable replacement logic that replaces the template variable 530$a$ with an output of an issue resolution classifier. The template variable 530$a$ may also have been directly entered into template input window 505 or entered using a user interface initiated by control 550.

In the example of FIG. 5A, the template variable 510 is one example of a template variable with variable replacement logic relating to a field name. In the example of FIG. 5A the square brackets may indicate the template variable 510 is replaced by a value for the field name enclosed by the square brackets. In some implementations, the user may type template variable 510 directly into the template input window 505. In some implementations, the user may use an interface initiated by control 555 to add template variable 510 to the narrative template. The example of FIG. 5A also includes a second template variable 535$a$ associated with variable replacement logic relating to a field name. In this example, the template variable 535$a$ is replaced with a rubric score value generated for the transaction. This value may be stored as part of the transaction. In some implementations, the rubric score may be considered a classifier output.

In the example of FIG. 5A, the template variable 525 is one example of a template variable with variable replacement logic relating to another template. In the example of FIG. 5A the name of the other template appears between vertical bars. In this example, the template variable 525 will be replaced with the content of the template identified between the vertical bars. In some implementations, the user may type template variable 525 directly into the template input window 505. In some implementations, the user may use an interface initiated by control 565 to add template variable 525 to the narrative template.

In the example of FIG. 5A the template variable 525 is part of a conditional template variable 515*a*. The curly brackets may indicate that template variable 515*a* is a conditional template variable. A conditional template variable is associated with more complex variable replacement logic that may use other template variables to determine what text replaces the conditional template variable. In the example of FIG. 5A, the conditional template variable 515*a* will be replaced with text that includes the agent name and the inclusion of another template if the value of the call transfer classifier is true (e.g., ==1). If this condition is not true, the conditional template variable 515*a* may be replaced with a null character. In some implementations, the conditional template variable 515*a* may have been entered directly into the template input window 505 by a user. In some implementations, the user may use an interface initiated by control 560 to add conditional template variable 515*a* to the narrative template. Conditional template variable 515*a* represents the flexibility disclosed implementations offer in generating the consistent narrative.

If the narrative template represented in FIG. 5A were selected as part of step 320 of FIG. 3 for a transaction where agent Bill Smith did not transfer the call, the automated narrative system may generate the following narrative for the transaction:

Customer Jane Park called about late delivery. Agent Smith gave the Miranda Warning. Agent Smith offered a future credit. Customer's sentiment was positive and customer expressed satisfaction. Issues are resolved. Agent rubric score: 96.

Figure 5B:
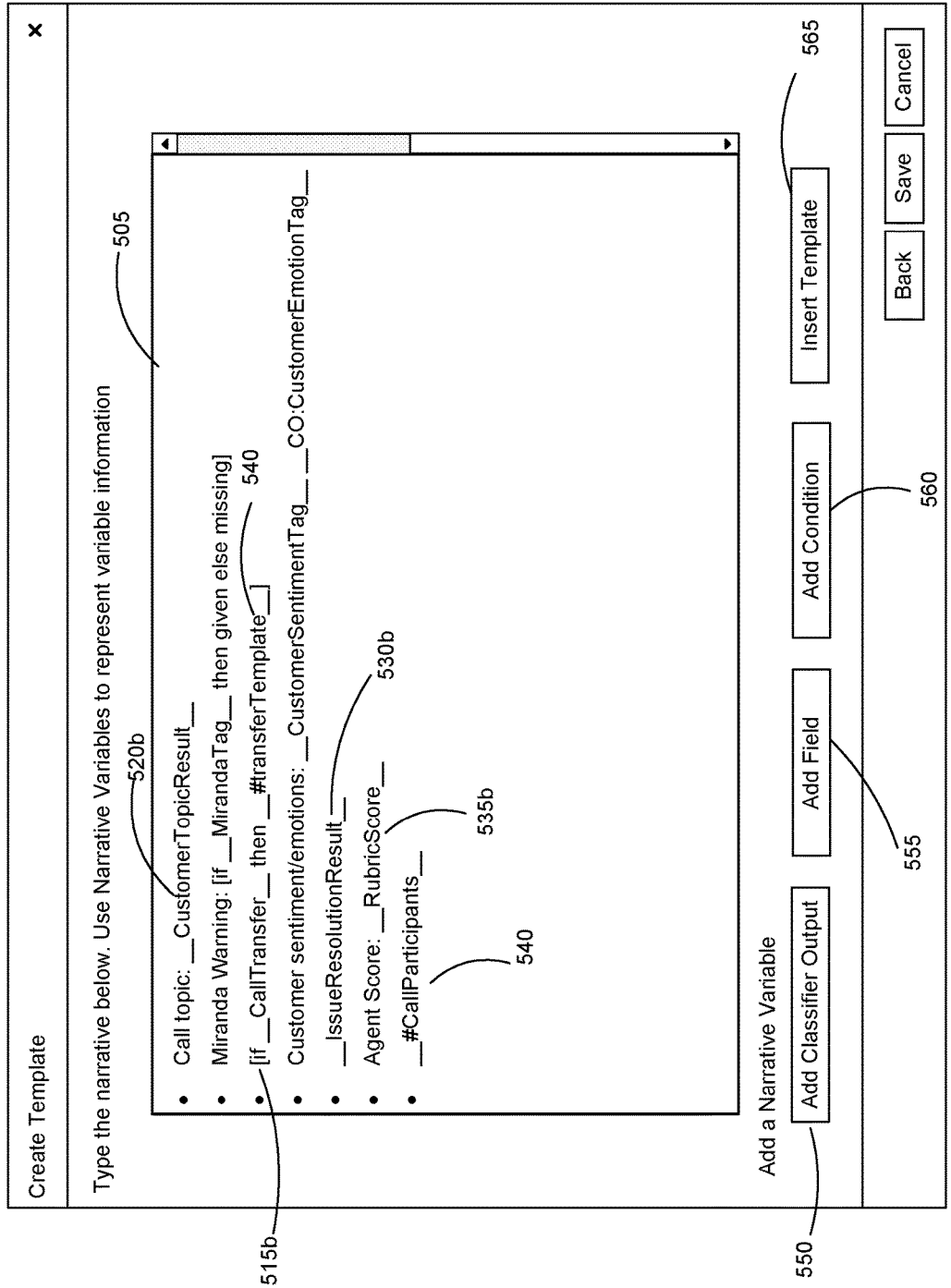
FIG. 5B is a diagram illustrating another example user interface for constructing an automated narrative template, according to an implementation.

FIG. 5B is a diagram illustrating another example of user interface 500 for constructing an automated narrative template, according to an implementation. In the example of FIG. 5B, the interface 500 is the same, but the content of the narrative template has changed. In this example, the narrative template has a bulleted format. In addition, the example of FIG. 5B uses _____ for all template variables, which are assumed to be stored, either temporarily or permanently, for the transaction. For example, variables 520*b* and 530*b*, use a classifier result similar to template variables 520*a* and 530*a* of FIG. 5A. Template variable 515*b* (similar to template variable 515*a* of FIG. 5A) may use square brackets to indicate the variable replacement logic is conditional. The example of template variable 515*b* includes a condition based on a binary classifier output identified using a template variable (e.g., 1 is TRUE and 0 is FALSE). If the condition is true, then another automated narrative template is included, i.e., a template identified by transferTemplate is imported. In this example a hashtag indicates the template variable is a template name. Template variable 535*b* may be replaced by a field identified by RubricScore, e.g., similar to template variable 535*a* in FIG. 5A. The example of FIG. 5B includes template variable 540, which is an example of inclusion of another template variable identified using the identifier "CallParticipants." If the narrative template represented in FIG. 5B were selected as part of step 320 of FIG. 3 for the transaction with agent Bill Smith, the automated narrative system may generate the following narrative for the transaction:

Call topic: late delivery.
Miranda Warning: given
Customer sentiment/emotions: positive/satisfaction.
Issues are resolved.
Agent score: 96
Agent: Bill Smith, Customer: Jane Park Implementations are not limited to the syntax illustrated in FIG. 5A or 5B; rather these figures illustrate how a narrative template may be structured to identify template variables, static text, and to include variable replacement logic for replacing the template variables. Thus, implementations include other similar techniques for identifying template variables and variable replacement logic syntax.

Figure 6:
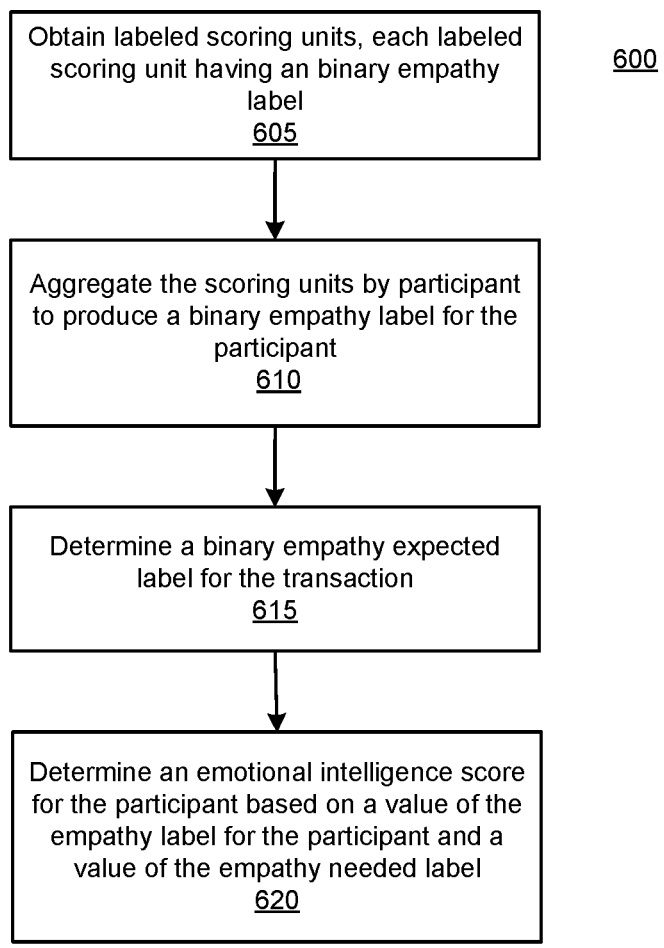
FIG. 6 is a flow diagram illustrating an example process for determining an emotional intelligence score for an interaction participant, according to an implementation.

FIG. 6 is a flow diagram illustrating an example process 600 for determining an emotional intelligence score for an interaction participant, according to an implementation. Process 600, or parts thereof, may be performed by an automated narrative system, such as system 100 of FIG. 1. Process 600 can also be performed by another computer system independent of an automated narrative system, e.g., used to tag scoring units for some other purpose, such as rubric generation. Process 600 begins with obtaining labeled scoring units for the transaction (605). The scoring units have been processed by an empathy classifier (e.g., existing or later developed) and, where appropriate, are tagged as showing empathy. The empathy tags may be added as metadata for a scoring unit. The system aggregates the scoring units by participant to produce a binary empathy label for each participant (610). In other words, if a scoring unit associated with a participant is tagged as showing empathy, then that participant's binary empathy label will indicate the presence of empathy. The system may then determine whether empathy would be expected for the transaction (615). Whether empathy is expected for the transaction may be determined based on the output of other classifiers, e.g., if a client participant is tagged as having elevated emotion, a client participant mentions certain words or topics (e.g., illness, death, etc.), if a client participant exhibits anger, etc. The system produces an emotional intelligence score for the participant based on whether the participant binary empathy label matches the empathy expected label (620). Put another way, if empathy was expected and given or if empathy was not expected and not given, the emotional intelligence score for the agent participant will be high. The emotional intelligence score will be lower if empathy is given when unexpected or expected and not given. In some implementations, a lowest score is given if empathy is expected but not given.

As indicated above, an emotional intelligence classifier may be used outside of an automated narrative template process. For example, a system may use the emotional intelligence classifier in a customized rubric, to trigger follow-up processes (e.g., training for the agent, etc.).

Figure 7:
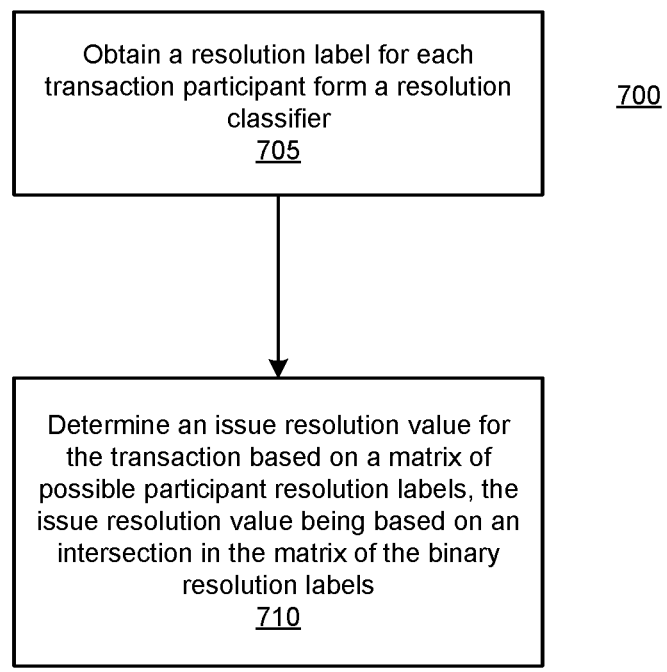
FIG. 7 is a flow diagram illustrating an example process for determining issue resolution, according to an implementation.

FIG. 7 is a flow diagram illustrating an example process for determining issue resolution, according to an implementation. Process 700, or parts thereof, may be performed by an automated narrative system, such as system 100 of FIG. 1. Process 700 can also be performed by another computer system independent of an automated narrative system, e.g., used to tag scoring units for some other purpose, such as rubric generation. Process 700 begins with obtaining a resolution label for each participant in a transaction from an issue resolution classifier (705). The resolution label may be binary; indicating either that that participant is either done (no outstanding tasks/all issues resolved) or not done (has outstanding tasks/issues remaining). The system may then build a resolution matrix and use the resolution matrix to determine an issue resolution value (tag or label) for the transaction (710). The resolution matrix may be based on the possible combinations of resolution labels for the participants. For example, if the transaction has two participants, the matrix may be a 2×2 matrix and if the transaction has three participants it may be a 2×2×2 matrix, etc. The issue resolution value may be determined by the intersection in the matrix of the binary resolution labels for the participants. For example, in a 2×2 matrix, if both participants have a resolution label of "done" the issue resolution value may be "resolved". If either of the participants is "done" and the other is "not done" the issue resolution value may be "pending". If both participants are "not done" the issue resolution value may be "unresolved." If either participant has an unknown resolution label the issue resolution may be marked as either "pending" or "unresolved." A value (e.g., 0, 1, 2) may be representative of the "resolved," "pending," and "unresolved" values. This output can be used in an automated narrative or in another process, such as a customizable rubric or as a trigger for some additional process or follow-up procedure.

FIG. 8 is a diagram illustrating an example record of a data structure 800 in a transaction scoring data structure, according to an implementation. In the example of FIG. 8, a transaction has three hierarchy levels. A highest level is the document 805, which represents the transaction. A document 805 has one or more verbatims 810 as an intermediate level in the hierarchy. A verbatim 810 represents everything attributed to one speaker during a turn. In other words, in a conversation with two speakers, the speakers take turns speaking. Each turn is a verbatim. Put another way, a question by speaker 1 is a first verbatim, the answer by speaker 2 is a second verbatim, and a follow-on question from speaker 1 is a third verbatim, etc. A transaction may have more than three speakers. For example, a social media post may have one speaker and comments to the post may be additional speakers. Similarly, a video conference or teleconference may include multiple participants. Some transactions may have a paragraph as the intermediate level in the hierarchy. Some transactions may not have an intermediate level in the hierarchy. A lowest level of the hierarchy is a sentence 815. Each verbatim 810 may have one or more sentences 815. For each sentence 815 represents a basic scoring unit. For each sentence 815 the data structure 800 tracks the verbatim that the sentence belongs to. The data structure 800 additionally includes metadata generated by a transformation system, such as a language, verbatim type, etc. The data structure 800 may also include the text included in the sentence 815 and any tags associated with the sentence 815. Similarly, the data structure 800 may include metadata for the verbatim 810 and metadata from the document 805.

FIG. 9 is a flow diagram illustrating an example process 900 for generating transaction metadata, according to an implementation. Transaction metadata may also be referred to as transaction attributes, and include attributes for scoring units within the transaction. Process 900, or parts thereof, may be performed by an automated narrative system, such as system 100 of FIG. 1. Process 900, or parts thereof, can also be performed by another computer system independent of an automated narrative system, e.g., for rubric generation, intelligent scoring of transactions, etc. As used herein with regard to transaction metadata, generation includes creation of new data items, calculation of data items, and curation of existing data. In other words, generation of transaction metadata includes integrating data or metadata received directly from a transactional system into transaction metadata structures used by disclosed systems. Such integrated metadata is considered data extracted from a transaction. A system may use process 900, or portions thereof, to analyze a transaction and generate (integrate, curate, and/or calculate) information for different logical views of the transaction. The metadata generated by process 900 can be used as features that support various analyses tasks, e.g., supporting one or more system classifiers (e.g., classifiers 136). Process 900 is described as being performed on one transaction, but systems implementing process 900 can apply process 900 against thousands or millions of transactions per day. In some implementations, a system may have several processors or threads that perform process 900 on multiple transactions in parallel. For ease of description, the example process 900 is described as applying to a transcribed audio interaction, but process 900 applies equally with minor modifications to other kinds of 2-way interactions, such as chats and email. Some of these modifications are mentioned.

The transactions are received from one or more data sources, e.g., data sources 180 of FIG. 1. Some of the transactions may have been pre-processed prior to being received by the system. For example, if the transaction is an audio call or video call, the transaction may have been processed by a transcription service to convert the conversation in the call to text. If the transaction did arise from an audio or video file and has not already been processed by a transcription service, the system may process the transaction with a transcription service (901). The transcription service converts audio dialog into text and sentences (where possible). Some transcription services also label the sentences with a speaker. Sometimes the speaker is identified by a name or phone number, for example if such information was provided prior to joining a conference call. Sometimes a speaker may be identified by a generic number or identifier (e.g., Speaker 1). Text-based contacts, such as a chat session or an email chain, do not need pre-processing with a transcription service.

The system may normalize the timestamps in the transaction by converting the timestamps into a time from the first verbatim. In a phone or video call, the first verbatim begins when the first participant begins talking. In a chat transaction (whether instant-message or text message), the first verbatim begins when the first participant in the chat sends a message to the other participant/participants. In an email communication, the first verbatim is the originating email communication. The system assigns the first verbatim a start time of zero and any other time stamps are calculated as the elapsed time since the start time of the first verbatim measured in some time domain, such as seconds, minutes, milliseconds, etc., depending on implementation requirements. Different kinds of transactions may have different time stamps associated with the scoring units. For example, a transcript of an audio call may have start and end times associated with each scoring unit, where a chat may have only a start time, which represents the time a message was sent. Thus, although normalizing the timestamps is discussed as normalizing the start and end times provided with the transaction, it is understood that step 905 includes normalizing any timestamp in the transaction being analyzed. Normalization ensures that the metadata is consistent across transactions from different sources and between transaction types.

The system computes metadata for the basic scoring units in the transaction (910). The basic scoring units can be sentences or sentence fragments, e.g., if a speaker does not complete a sentence or if the transcription service breaks a sentence up because of cross talk. In some implementations the basic scoring unit could be phrases or tokens. The segment metadata structure 1010 of FIG. 10 is an example of the metadata computed/generated for the basic scoring units. In the example of FIG. 10, each basic scoring unit is given an identifier and a type. The type is a data field indicating the type of scoring unit to which the metadata applies. In the example of FIG. 10, the type can be a turn, a sentence, or a token. Of course, the metadata may use numbers or even bits to represent the different types. This applies to any of the metadata fields with enumerated types that are illustrated in FIG. 10. For the remainder of the discussion of FIG. 9, it is assumed that the basic scoring unit is a sentence, but implementations are not limited to using a sentence as the basic scoring unit.

The system may calculate a duration for the sentence. The duration may be the difference between the start time and the end time. In scoring units that aggregate other scoring units, the duration is the difference between the start of the first scoring unit being aggregated and the end time of the last scoring unit in the aggregation. The system may assign a participant identifier to the scoring unit. The identifier can be any number or string that uniquely identifies a participant in the transaction (e.g., phone number, name, randomly assigned number, screen name, employee id, etc.) In some implementations, and for certain transaction types, the system may calculate the relative position of the scoring unit within the context of the overall transaction. For example, the system may divide the start time (measured in time units from zero, i.e., from the start of the first sentence in the transaction) of the sentence by the end time of the last scoring unit of the transaction (also measured in time units from zero). Thus, the relative position may represent a percentage of the total length of the transaction. The relative position may not be calculated for some transactions, such as email and may or may not be calculated for chat transactions. In some implementations, the sentence may also have a predecessor event. The predecessor event may indicate that dead air or a hesitation preceded the scoring unit.

Returning to FIG. 9, the system may also generate metadata for special events (915). Special events may account for things that occur in the 2-way communication that do not fit into scoring units. For example, a special event in an audio call may include silence. In some implementations, different kinds of silence may be labeled and tracked differently. For example, silence that occurs between the same participant's scoring units may be identified as a hesitation, such as when a participant is speaking, pauses to think or process, and begins speaking again. As another example, silence that occurs between participant scoring units may be identified as a dead air, such as when one participant asks a question and the other participant does not respond right away (e.g., waiting a few seconds or more). In some implementations, silence may be defined as exceeding a minimum threshold, e.g., less than a second of less than two seconds. Another kind of special event may be defined as a hold period, e.g., when an agent puts a customer on hold. Hold could be considered another type of silence that is not dependent on what participant was speaking before and after the silence. As another example of a special event, an email may include an attachment, such as a picture, that may not be accounted for in the scoring unit analysis. Implementations may also include other kinds of special events. The special event structure 1020 of FIG. 10 illustrates one example data structure for the metadata for special events. Of course, a transaction may not have any special events, so this metadata may not be generated for every transaction. In some implementations, the special event metadata may be generated concurrently with the sentence metadata.

The system may also generate metadata for aggregations of scoring units, e.g., for each sentence belonging to a turn, or verbatim, of a participant (920). A verbatim represents everything attributed to one participant during a turn, e.g., all sentences sent or spoken by one participant without the other participant interacting. A verbatim can thus represent one or more sentences. The metadata generated for a verbatim is similar to that generated for the sentence scoring units. In some implementations, the verbatim is another type of scoring unit, and thus may have metadata similar to the segment metadata structure 1010 of FIG. 10. The start of a verbatim may represent the start of the first sentence and the end of a verbatim may represent the end of the last sentence in the verbatim. A verbatim (or other aggregation) may inherit the predecessor of its first scoring unit.

The system may also generate metadata for each participant (925). The participant metadata may represent aggregate values calculated based on the participant identifiers of the scoring units. Participant metadata structure 1015 of FIG. 10 is an example of the kind of participant metadata the system may generate. In some implementations, the system may identify the type of participant, such as Agent or Client. This metadata may be left out or may have a value of Unknown or NULL if the participant type cannot be determined. The system may optionally include other attributes of the speaker, such as gender, and whether the agent is a non-human smart assistant. These are optional and implementations may include other attributes of a participant. In some implementations, the system may calculate total hesitation for a participant. As indicated above, hesitation is a particular kind of silence that occurs between sentences/communication of a single participant. Total hesitation may reflect the total duration of hesitations that occur during the transaction for that particular participant. In other words, the participant hesitation may represent the accumulated length of silences that follow a participant sentence and precede the succeeding sentence. In some implementations only silences that meet a predefined threshold may be included in the accumulation. For example, silence of less than 2 seconds between a speaker's sentences (or within the sentence) may not be attributed to hesitation and may not be included in total hesitation for a participant. The system may also calculate dead air attributed to a participant. Dead is attributed to a participant if it occurs prior to a scoring unit (e.g., sentence) for the participant. Dead air is similar to hesitation but occurs between a scoring unit for one participant and another. Thus, for example, dead air lasting less than a predetermined time may not be counted as dead air in the total dead air for a participant (or as a special event). In some implementations, the system may also calculate how much silence is attributable to a participant. For example, the system may add the total hesitation and total dead air for the participant and divide this by the duration/length of the transaction. Similarly, the system may calculate a percentage of talk time attributable to the agent. The percentage of talk time may be the sum of dead air, hesitation, and basic scoring unit time attributable to the agent divided by the overall length (duration) of the transaction. In some implementations, the system may also determine an outcome for the participant. The outcome for a participant may be an indication of whether the participant has a further task to perform. For example, if the agent transfers the call to another agent, that agent may be done, but the customer is not. Similarly, if the agent needs to research and then call the customer back, the customer may be done but the agent is not. In some implementations, the outcome for a participant may be generated by a machine-learned classifier or a rule-based classifier applied to the transaction information and metadata.

The system may also generate metadata for the transaction, e.g., at the document level (930). The transaction metadata may aggregate participant and/or segment metadata and also include metadata that applies to the transaction as a whole. Document metadata structure 1005 is an example of the metadata that the system may generate for the transaction. For example, the metadata for the transaction may include a source of the communication, which may also be referred to as a transaction type. Different transaction sources can have different attributes (e.g., an email may use number of replies as a length rather than using time or a chat may not have hesitation attributes, e.g.) that may affect classifier output. Thus, the source can affect what attributes and attribute values are included in the metadata. The transaction metadata may also include a duration of the transaction. For a call transaction type, the duration may be calculated as the time between the start of the first scoring unit and the end of the last scoring unit for the transaction. If an end time is not available (e.g., for a chat or if the call transcription does not include end times), the duration may be measured from the start of the first scoring unit and the start of the last scoring unit. The metadata may also include an aggregate of other statistics, such as total silence for the transaction. Silence occurs when no participant is speaking during a communication with audio. In some implementations, only silence that lasts at least a predetermined time, e.g., 1 second, 2 seconds, 3 seconds, etc. may be attributed to silence and included in the total silence metadata. In some implementations, silence that lasts longer than the predetermined time but that occurs within a sentence (determined by natural language processing) is not included in the total silence metadata. In some implementations, a percent of the transaction that is silence may be calculated, e.g., as the result of the division of the total silence amount by the total duration amount. In some implementations, the system may include the longest silence in the transaction metadata. The longest silence is the length (e.g., in milliseconds) of either dead air or hesitation attributable to any participant. In some implementations, this attribute may apply to call transactions, but not to chat transactions.

In some implementations, the system may calculate the total accumulated length of overtalk. Overtalk occurs when both speakers are speaking at once. Put another way, any two (or three etc.) sentences attributable to two (or three etc.) different speakers that overlap contribute to overtalk length. In some implementations, overtalk may be calculated when end timestamps are available (e.g., if end timestamps added by transcription services to the transcription). As one example, if a first speaker has two sentences attributed to her, from 0 ms to 5000 ms and from 5500 ms to 6500 ms and a second speaker has one sentence attributable to him, from 3500 ms to 7000 ms, the length of overtalk calculated for the three sentences is 1500+1000, or 2500 ms. Any overlap in the basic scoring units in the transaction may be summed and stored as total overtalk. In some implementations, the transaction metadata may include total hesitation. Total hesitation may be the sum of the hesitation attributable to the participants. Similarly, some implementations may include total dead air in the transaction metadata, which is the sum of the dead air attributable to the transaction participants. Some implementations may calculate a time to first response for the transaction. The time to first response may measure the time from the first agent start time from the previous client end time (for a call) or previous client start time (for a chat). In some implementations, the metadata for a transaction may include a percentage of agent talk time. This time may represent the total time of all participants of an AGENT type are speaking during the transaction. Cross talk between agents (e.g., if two agent participants overlap) is not counted twice. Thus, to calculate this attribute the system may count as agent talk time the start of the first sentence by the first agent and the end of the second sentence by the second agent where the two sentences overlap. The system may divide the sum of all agent talk time by the duration of the transaction.

In some implementations, classifiers may be used to add transaction metadata. For example, a transaction outcome may be calculated. In some implementations the transaction (or conversation) outcome may be calculated using an issue resolution detector, e.g., as described with regard to FIG. 7. Thus, the outcome may be based on the participant outcomes. In some implementations, the transaction metadata may also include a concluding event indicator. The concluding event may be determined by one or more rules-based classifiers. The concluding event may be determined by one or more reason tags, e.g., such as the reason detector of FIG. 11. For example, a scoring unit may tag a sentence as indicative of a solution or likely to include a resolution for the transaction. Such reason tags or other classification output may be used to indicate a concluding event for the transaction.

While the operations of process 900 are listed sequentially, implementations can perform the operations in parallel or in another order. For example, some document metadata can be determined before analysis of any scoring units, but some document metadata relies on generation of other metadata. Thus, implementations are not limited to the order of the steps illustrated in process 900. The system may perform all or most of process 900 during pre-processing, e.g., by pre-processing system 112. In some implementations, the system may add/generate some or all of the transaction metadata for the transaction during transformation (e.g., by transformation system 120) and/or during analysis (e.g., by Analysis system 130). In some implementations, the system may store at least some of the metadata generated using process 900 in data store 140. Metadata stored in the data store 140 may be used in the variable replacement logic, templates, rubric generation, selection criteria, etc. of disclosed implementations.

Figure 11:
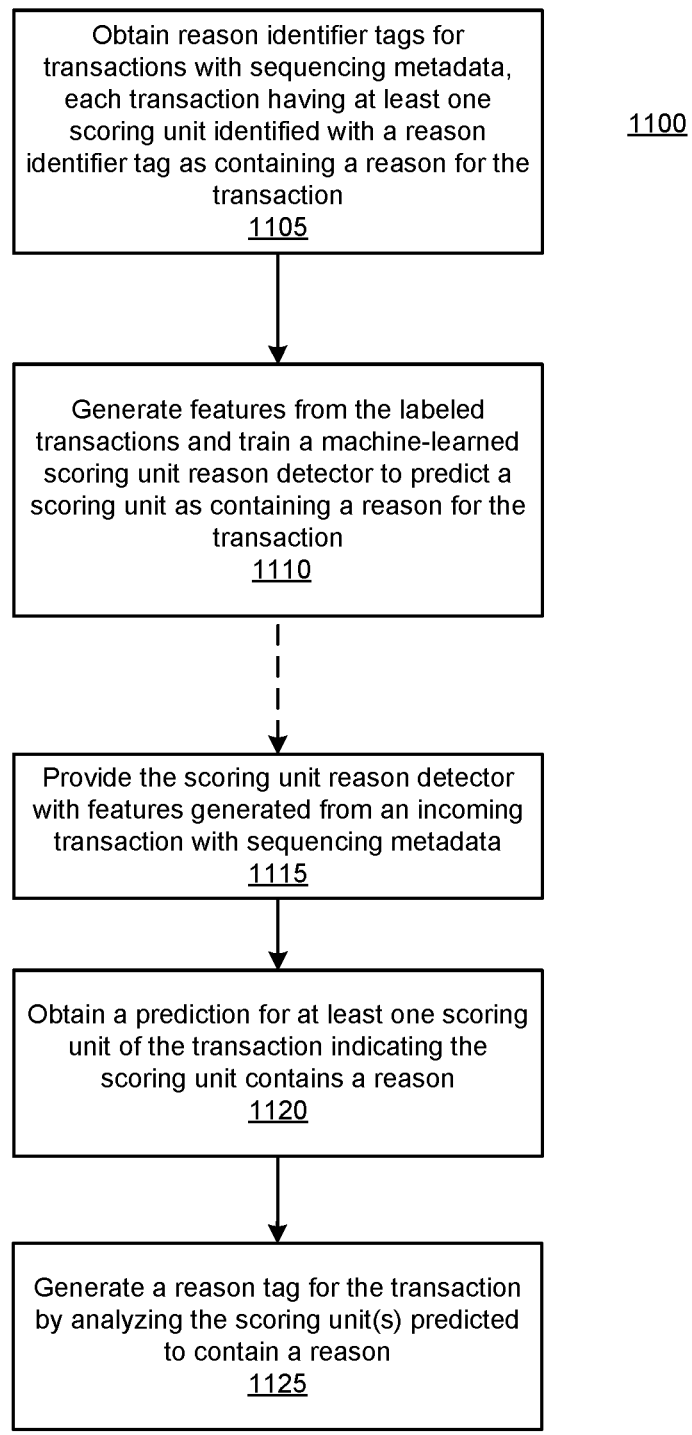
FIG. 11 is a flow diagram illustrating an example process for a machine-learned reason detector, according to an implementation.

FIG. 11 is a flow diagram illustrating an example process for a machine-learned reason detector, according to an implementation. Some implementations may include other reason detectors, whether rules-based or machine learned. Process 1100, or parts thereof, may be performed by an automated narrative system, such as system 100 of FIG. 1. Process 1100 can also be performed by another computer system independent of an automated narrative system, e.g., used to tag scoring units for some other purpose. Non-exhaustive examples include rubric generation, generating agent reports, a dashboard system, etc. Process 1100 can be performed multiple times to generate/use different reason detectors. For example, a reason detector may tag/label a scoring unit as including a reason for the contact. Another reason detector may tag/label a scoring unit as exhibiting a reason empathy from the agent might be expected. Another reason detector may tag/label a scoring unit as including a transfer reason. In some implementations, the reason detector may be trained as a multi-class classifier, e.g., configured to generate one or more reason tags.

Process 1100 begins with obtaining reason identifier tags (also called labels) for transactions (1105). The reason identifier tags apply to one or more scoring units of the transaction. The reason identifier tag indicates that the tagged scoring unit contains a reason, e.g., a reason for the call, a reason empathy is expected, a reason for a call transfer, etc. In some implementations, the reason identifier tag may be a number that represents a particular reason type. In implementations where the reason detector is a multi-class classifier, the reason identifier tags may include multiple different kinds of reason identifier tags. The transactions include sequencing metadata, e.g., the metadata described in FIG. 10. The sequencing metadata may be added before the scoring units are labeled or after the scoring units are labeled. The sequencing metadata includes scoring unit, participant, and transaction level metadata. The system may then generate features describing the labeled transactions (1110). For example, each transaction may have a vector with several hundred or more dimensions, with each dimension representing a different feature. The features (dimensions) are based on the content of the scoring units as well as the metadata describing the scoring units, any special events, the sequencing of the scoring units and special events, the participants, the transaction, etc. Thus, some or all of the metadata described in FIG. 10 may be used as features. The features may be used to train a machine-learned classifier (e.g., a support vector machine, a neural network, a deep-neural network) to provide a reason identifier tag (or tags, depending on the implementation) to zero or more scoring units. In some implementations, training the reason detector may include fine-tuning the trained detectorSteps 1105 and 1110 represent a training phase of the reason detector. The reason detector may undergo periodic retraining with additional training data (scoring units labeled with reason identifier tags).

After training, the trained reason detector may be used in inference mode (e.g., steps 1115 to 1125). In inference mode, features for unlabeled transactions are provided to the reason detector and the reason detector provides information from which reason labels can be attached to scoring units. In particular, a system may generate features for an unlabeled transaction and provide the trained reason detector with the features (1115). The unlabeled transaction has the sequencing metadata, so that the metadata can be included in the features, as it was during training. The reason detector may provide a prediction for a reason identifier tag for zero or more scoring units of the transaction (1120). The prediction may represent a probability that the scoring unit does include or reflect the particular reason. The system may convert the predictions into reason tags (1125). For example, if a prediction for a particular scoring unit is greater than a given threshold (e.g., 70%, 80%, etc.) the system may add a reason tag to the metadata for the scoring unit that indicates that scoring unit represents the purpose for the transaction (e.g., the reason the customer called). If the prediction for the particular scoring unit fails to meet the threshold, the system may not add the tag, or may give the tag a value that indicates this scoring unit does not relate to the purpose of the transaction. If the reason predictor provides multiple predictions (e.g., for multiple tags), the system analyzes the other predictions and generates other tags (e.g., a tag that indicates a scoring unit exhibits a reason for empathy, or a tag that indicates a scoring unit represents a reason for a transfer, a tag that indicates a resolution for the participant, etc.) for the scoring unit. The tags generated by process 1100 can then be used for populating templates, for rubric scoring, for generating reports, as a trigger for some additional process or follow-up procedure, etc.

Methods discussed above may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It can be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It can be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It can be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It can be further understood that terms, e.g., those defined in commonly used dictionaries, should be interpreted as having a meaning that is consistent with their meaning in the context of the relevant art and cannot be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments are not limited by these aspects of any given implementation.

Lastly, it should also be noted that while particular combinations of features described herein, the scope of the present disclosure is not limited to the particular combinations, but instead extends to encompass any combination of features or embodiments herein disclosed irrespective of whether or not that particular combination has been specifically enumerated.

In one aspect, a system for includes at least one processor, memory storing a library of classifiers, and memory storing instructions that, when executed by the at least one processor, causes the system to provide a user interface configured to generate an automated narrative template by receiving non-variable text and variable portions, wherein each variable portion of the variable portions has respective variable replacement logic for replacing the variable portion and storing the automated narrative template in a data store. The system may also include memory storing an automated narrative engine configured to use the automated narrative template to generate and store, for a transaction, a narrative, wherein generating the narrative includes executing variable replacement logic for a field tag to replace the field tag with data extracted from the transaction and executing variable replacement logic for a classifier tag to replace the classifier tag with text based on output of a classifier from the library of classifiers applied to at least one scoring unit of the transaction.

These and other aspects may include one or more of the following, alone or in combination. For example, the variable replacement logic may replace the variable portion with a field, with a classifier output, or with a conditional value.

In some implementations, the conditional value includes a condition portion evaluated based on classifier output identified in the condition portion. As another example, at least one of the classifiers in the library of classifiers takes as input the output of a first classifier in the library of classifiers and the output of a second classifier in the library of classifiers.

According to one aspect, a method includes receiving a transaction, the transaction including scoring units, generating metadata for the transaction and scoring units, applying classifiers in a library of classifiers to the scoring units to generate classifier tags for the scoring units, at least some of the classifiers using the metadata as input, generating a narrative from an automated narrative template stored in a memory, the automated narrative template including non-variable portions and at least a first variable portion by executing variable replacement logic for the first variable portion that replaces a variable in the first variable portion with text using output of a classifier in the library of classifiers; and storing the narrative for the transaction.

These and other aspects can include one or more of the following, alone or in combination. For example, the transaction may be an interaction between a customer and a first agent and the method further includes displaying the narrative to a second agent, the second agent interacting with the customer as part of a second transaction. As another example, the metadata for the transaction can include normalized timestamps measuring time units since a first scoring unit, a relative position of scoring units within the transaction, and a time to first response, wherein the transaction metadata is used as input for at least some of the classifiers. The metadata for the transaction can include metadata for silence, hesitation, dead air, and/or overtalk in the transaction. As another example, the automated narrative template can include a second variable portion that includes a field tag, and the method further includes replacing the field tag with a value extracted from the transaction or a metadata value generated for the transaction. As another example, the automated narrative template can include a second variable portion that includes a conditional tag, the conditional tag including a condition portion and a template portion, the condition portion be associated with a second classifier of the classifiers and the method can also include evaluating the condition portion based on output of the second classifier; and including, in accordance with the evaluation, the template portion in the narrative. As another example, the automated narrative template can include a second variable portion that includes a conditional tag, the conditional tag including a condition portion and a second variable portion associated with a second classifier of the classifiers and the method can also include evaluating the condition portion; and including, in accordance with the evaluation, a value based on output of the second classifier for the transaction. As another example, at least one of the classifiers can be a reason detector configured to label a sentence in the transaction as including or not including a contact reason. The reason detector may be a multi-class classifier and is further configured to label a sentence in the transaction as a reason for requiring empathy. As another example, at least one of the classifiers may be an emotional intelligence detector configured to label an agent participant as either displaying emotional intelligence or lacking emotional intelligence. The emotional intelligence detector may take as input an indication of whether, for the transaction, empathy was needed or not and whether empathy was displayed or not. As another example the narrative may be requested by a source system and the method also includes sending the narrative to the source system. As another example, the method may also include sending the narrative to a third party server. As another example, the method can include providing a user interface for editing the automated narrative template; receiving a new non-variable portion; receiving a new variable portion, including receiving variable replacement logic for replacing the new variable portion with output obtained from a second classifier of the classifiers, and storing the edits to template in the memory. As another example, the transaction may be an interaction between a customer and a first agent and the method further includes displaying the automated narrative to a user.

In another aspect, a non-transitory computer-readable medium stores instructions that, when executed by at least one processor, causes a computing system to perform any of the methods or processes disclosed herein.

What is claimed is:

1. A system comprising:
   at least one processor;
   memory storing a library of classifiers, each configured to output a different respective type of classifier tag;
   memory storing instructions that, when executed by the at least one processor, causes the system to perform operations including:
      providing a user interface configured to generate an automated narrative template by receiving non-variable text and variable portions, wherein each variable portion of the variable portions represents a template variable selected by a user that is associated with variable replacement logic configured to replace the template variable with text based on data derived from a transaction, wherein the template variable identifies one of a field tag or a classifier identifier, and
      storing the automated narrative template in a data store; and
   memory storing an automated narrative engine configured to use the automated narrative template to generate and store, for a transaction, a narrative,
   wherein generating the narrative includes:
      executing variable replacement logic for a field tag to replace the field tag with data extracted from the transaction, and
      executing variable replacement logic for a classifier identifier to replace the classifier identifier with text based on a classifier tag output by a classifier, from the library of classifiers, that corresponds to the classifier identifier, the classifier tag being output in response to application of the classifier to at least one scoring unit of the transaction.

2. The system of claim 1, wherein the automated narrative template further includes a variable portion of the variable portions having a template variable that identifies a conditional tag.

3. The system of claim 2, wherein the conditional tag includes a condition portion and a template portion, the condition portion including a classifier identifier and wherein the variable replacement logic for the conditional tag is configured to evaluate the condition portion based on a classifier tag output by the classifier identified in the condition portion and include the template portion in the narrative in accordance with the evaluation.

4. The system of claim 1, wherein at least one of the classifiers in the library of classifiers takes as input the output of a first classifier in the library of classifiers and the output of a second classifier in the library of classifiers.

5. The system of claim 1, wherein at least one of the classifiers in the library of classifiers takes as input metadata describing participants, special events, dead air, and hesitation in the transaction.

6. The system of claim 1, wherein at least one of the classifiers in the library of classifiers is a reason detector configured to label a sentence in the transaction as including or not including a contact reason.

7. A method comprising:
   receiving a transaction, the transaction including scoring units;
   generating metadata for the transaction and the scoring units;
   applying classifiers in a library of classifiers to the scoring units to generate classifier tags for the scoring units, at least some of the classifiers using the metadata as input, and the classifier tags representing different types of classification;
   generating a narrative from an automated narrative template stored in a memory, the automated narrative template including non-variable portions and at least a first variable portion that includes a classifier identifier, by executing variable replacement logic for the first variable portion that replaces the classifier identifier with text based on a classifier tag output by a classifier in the library of classifiers that corresponds to the classifier identifier; and
   storing the narrative for the transaction.

8. The method of claim 7, wherein the transaction is an interaction between a customer and a first agent and the method further comprises:
   displaying the narrative to a second agent, the second agent interacting with the customer as part of a second transaction.

9. The method of claim 7, wherein the metadata for the transaction includes normalized timestamps measuring time units since a first scoring unit, a relative position of scoring units within the transaction, and a time to first response, wherein the metadata for the transaction is used as input for at least some of the classifiers.

10. The method of claim 9, wherein the metadata for the transaction includes metadata for silence, hesitation, and dead air in the transaction.

11. The method of claim 7, wherein the metadata for the transaction includes metadata for overtalk in the transaction.

12. The method of claim 7, wherein the automated narrative template includes a second variable portion that includes a field tag, and the method further includes replacing the field tag with a value extracted from the transaction or a metadata value generated for the transaction.

13. The method of claim 7, wherein the automated narrative template includes a second variable portion that includes a conditional tag, the conditional tag including a condition portion and a template portion, the condition portion be associated with a second classifier of the classifiers and the method further includes:
   evaluating the condition portion based on output of the second classifier; and
   including, in accordance with the evaluation, the template portion in the narrative.

14. The method of claim 7, wherein the automated narrative template includes a second variable portion that includes a conditional tag, the conditional tag including a condition portion and a second variable portion associated with a second classifier of the classifiers and the method further includes:
   evaluating the condition portion; and including, in accordance with the evaluation, a value based on output of the second classifier for the transaction.

15. The method of claim 7, wherein at least one of the classifiers is a reason detector configured to label a sentence in the transaction as including or not including a contact reason.

16. The method of claim 15, wherein the reason detector is a multi-class classifier and is further configured to label a sentence in the transaction as a reason for requiring empathy.

17. The method of claim 7, wherein at least one of the classifiers is an emotional intelligence detector configured to label an agent participant as either displaying emotional intelligence or lacking emotional intelligence.

18. The method of claim 17, wherein at the emotional intelligence detector takes as input an indication of whether, for the transaction, empathy was needed or not and whether empathy was displayed or not.

19. The method of claim 7, wherein the narrative is requested by a source system and the method further comprises:
sending the narrative to the source system.

20. The method of claim 7, further comprising sending the narrative to a third party server.

21. The method of claim 7, the method further comprising:
providing a user interface for editing the automated narrative template;
receiving a new non-variable portion;
receiving a new variable portion, including receiving variable replacement logic for replacing the new variable portion with output obtained from a second classifier of the classifiers; and
storing the edits to template in the memory.

* * * * *